United States Patent [19]

Kimura et al.

[11] Patent Number: 4,604,633

[45] Date of Patent: Aug. 5, 1986

[54] INK-JET RECORDING APPARATUS

[75] Inventors: Yoshiaki Kimura, Hachioju; Yasuhiko Tanaka, Tokyo, both of Japan

[73] Assignee: Konishiroku Photo Industry Co., Ltd, Tokyo, Japan

[21] Appl. No.: 559,496

[22] Filed: Dec. 8, 1983

[30] Foreign Application Priority Data

| | | | |
|---|---|---|---|
| Dec. 8, 1982 | [JP] | Japan | 57-216031 |
| Dec. 8, 1982 | [JP] | Japan | 57-216032 |
| Dec. 23, 1982 | [JP] | Japan | 57-230841 |
| Dec. 23, 1982 | [JP] | Japan | 57-230842 |
| Dec. 23, 1982 | [JP] | Japan | 57-230843 |
| Dec. 23, 1982 | [JP] | Japan | 57-230844 |
| Dec. 23, 1982 | [JP] | Japan | 57-230845 |

[51] Int. Cl.[4] .......... G01D 18/00

[52] U.S. Cl. .......... 346/140 R; 73/293; 250/231 R; 340/619

[58] Field of Search .......... 346/140 R; 73/293; 250/231 R, 577; 340/619

[56] References Cited

U.S. PATENT DOCUMENTS

| | | | |
|---|---|---|---|
| 3,308,303 | 3/1967 | Weichselbaum | 250/231 R |
| 4,074,284 | 2/1978 | Dexter | 346/140 R |
| 4,342,042 | 7/1982 | Cruz-Uribe | 346/140 R |
| 4,422,084 | 12/1983 | Saito | 346/140 R |
| 4,475,116 | 10/1984 | Sicking | 346/140 R |

FOREIGN PATENT DOCUMENTS

| | | |
|---|---|---|
| 53-12138 | 4/1978 | Japan . |
| 54-35936 | 11/1979 | Japan . |

*Primary Examiner*—Joseph W. Hartary

*Attorney, Agent, or Firm*—Frishauf, Holtz, Goodman & Woodward

[57] ABSTRACT

An ink-jet recording apparatus having a detecting means for detecting ink pressure or an ink-residual quantity in the ink supply. The detecting means has a light shielding means coupled to the flexible diaphragm of the ink supply so as to be movable responsive to deformation of the flexible diaphragm. An ink pressure variation of −5 to −10 cm $H_2O$ results in a diaphragm displacement of 5 um/cm $H_2O$ to 20 mm/cm $H_2O$.

9 Claims, 64 Drawing Figures

INK-JET RECORDING APPARATUS

BACKGROUND OF THE INVENTION

1. Field of the Invention

This invention relates to an ink-jet recording apparatus having a detecting means for detecting an ink-pressure or an ink-residual quantity disposed to a part of an ink-supply system for supplying ink from an ink-reservoir to an ink-jetting system incorporated with ink-droplet jetting nozzles.

2. Description of the Prior Art

In an ink-jet recording apparatus, there are advantages that it is capable of not only recording at a high speed and with a very low noise but also using low-cost plain paper sheets and eliminating such a complicated step as development, fixation and the like. In addition, it is capable of making dot size and intervals relatively smaller so as to perform a highly sharp image recording, and is also effective to record Chinese characters, patterns and the like.

Concerning the recording heads for the ink-jet recording apparatuses, several types thereof have so far been developed and put into practice.

For example, as disclosed in Japanese Patent Examined Publication No. 12138/1978, the so-called "on-demand" type of ink-jet recording apparatuses have recently been developed and attracted attention. In this type apparatuses, ink-droplets are jetted through nozzles according to the change of each volume of pressure chambers every time when electric pulses are applied to a recording head in correspondence to every electric signal for recording.

One of the advantages of this on-demand type is that the amount of ink consumed may be economized, high reliability may be secured and the apparatus itself may also be made compact in size, light in weight and low in cost, because ink is jetted only when needed in correspondence to image signals so that no system for collecting ink may be required.

Another advantage thereof is that a high resolving power printing and a high speed printing may be performed and a colorized printing may also readily be made.

In addition to the above, there is another on-demand type ink-jet recording apparatus disclosed in Japanese Patent Examined Publication No. 35936/1979. This type has adopted therein such a system as loaded in a single recording head with a plurality of nozzles.

FIGS. 1 and 2 are a sectional view and a plain view respectively of the typically schematized illustration of this type.

FIG. 3 shows an ink-jet recording head concretely comprising seven units of nozzle series arranged according to the above-mentioned recording method.

In FIGS. 1 through 3, a plurality of nozzles 1, a plurality of pressure chambers 2 connected to the nozzles 1 respectively, and a common ink chamber 3 for commonly distributing ink supplied from ink-reservoir 7 into the pressure chambers 2, each of which is arranged onto the same plane so as to construct a recording head.

Ink for recording use is supplied through the ink-reservoir 7, filter 6, valve means 5, ink supply tube 4 and then to common ink chamber 3. The common ink chamber 3 is branched into a plurality of pressure chambers 2 each connected to a plurality of nozzles 1 each corresponding to image elements in the vertical direction of an image. A piezoelectric transducing element 8 connected electrically to an electron pulse generator 9 is attached to a part of the wall of each pressure chamber 2. The piezoelectric transducing element 8 is a flexible plate suitably capable of being flexible inward the pressure chamber 2 when it receives an electric signal generated from the generator 9. This element comprises, for example, a piezoelectric crystal and is attached to the outer wall of the pressure chamber with an electro-conductive thin diaphragm.

In this method, the piezoelectric transducing element 8 is abruptly bent inward the pressure chamber 2 upon the receipt of an electric signal generated from the electron pulse generator 9. By the rapid reduction of the volume of pressure chamber 2 thus caused, ink inside the chamber is jetted out and flown in the form of ink-droplets from nozzle 1 to a facing recording paper to complate a dot-recording. The amount of ink reduced by being jetted out from pressure chamber 2 is replenished with ink flowed from common ink chamber 3 where the ink is stored into pressure chamber 2. The amount of ink reduced in common ink chamber 3 is detected as a pressure reduction by means of liquid pressure detecting means which are provided each to flexible diaphragm 10 made a part of the wall of common ink chamber 3 and to the outside of the flexible diaphragm 10, respectively. The liquid pressure detecting means comprises a long cantilever type beam 11 whose front end is attached to the displacement detection part of the flexible diaphragm 10 and strain gauge 12 provided to the base of the beam 11.

When the liquid pressure detecting means detects that the liquid pressure of common ink chamber 3 dropped to not higher than the specified lowest level, then an electric signal is dispatched to open valve means 5 and ink is introduced from the ink reservoir through ink supply tube 4 to common ink chamber 3. When the liquid pressure of common ink chamber 3 to be detected by the liquid pressure detecting means is raised to not lower than the specified highest level, then the value means is closed to stop the ink flow from ink reservoir 7 to common ink chamber 3. Thus, the liquid pressure of common ink chamber 3 is maintained constantly within the range between the highest level and the lowest level. In the state that the liquid pressure is within the range, ink droplets can be jetted out stably and continuously from nozzles 1.

In the meanwhile, the flexible diaphragm 10 is formed to serve as the upper wall of the common ink chamber 3 of the recording head by attaching it over to the opening of the common ink chamber 3 so as to cover the opening to tightly close the ink in the chamber 3. The volume of the common ink chamber 3 is so made large enough as to correspond to the changes of the volume of pressure chambers 2.

Common ink chamber 3 and flexible diaphragm 10 each are so constructed as to absorb the pressure of ink return caused by the deformation of pressure chambers 2 at the time when ink is filled therein and is jetted. In a multi-nozzle type recording head, the so-called channel interruption is caused in which a pressure wave generated from the pressure chamber 2 of a channel undulates to the pressure chamber 2 of another channel through the common ink chamber 3 to deteriorate the jet-flying performance of ink-droplets from the other channel. Te described common ink chamber 3 and flexible diaphragm 10 are capable of preventing such a pressure wave from passing around.

In such a recording head constructed as mentioned above, a constant liquid pressure of ink should be maintained in the recording head, however, there may be some instances where a liquid pressure is lowered by the following reasons:

Namely, ink pressure fluctuates much in a recording head because of the rapid change of the amount of ink consumed which is caused with the change of dot density at the time of recording, or of the change of the residual amount of ink in the ink reservoir. Because of this fluctuation of ink pressure level, it has been difficult to stabilize the flying performance of ink-droplets jetted from the nozzles. In the serious cases, there have been such instances where the replenishment of ink could not come level with the consumption thereof and air bubbles were inhaled from nozzles because the liquid pressure were lowered, so that an ink-jet recording has failed into trouble.

In a recording head in which ink is supplied by a hydrostatic pressure, when an ink reservoir and the recording head are connected by an ink supply system, the change of an ink volume is somewhat absorbed by ink traffic between the recording head and the ink reservoir, however, when the recording head is preserved independently after removing from a recording apparatus (e.g., a printer), ink overflows from the nozzles or air bubbles are inhaled from the nozzles, during preservation by the abovementioned temperature change or by evaporation, because the recording head is sealed at the ink entrance path so as not to inhale any air bubble.

Further, in the conventional hydrostatic pressure type ink supply systems in which an almost constant ink-pressure is maintained in a recording head, the height of an ink reservoir is fixed to the position of the recording head. It is, therefore, difficult to maintain a constant liquid pressure according to the changes in the amount of ink consumed, remained, and the like.

Also, in an ink-jet recording apparatus in which pressurized ink is supplied from an ink reservoir having a pressurizing means and the liquid pressure is adjusted by a valve means provided to the halfway of an ink supply system so as to supply ink into a recording head, or in another ink-jet recording apparatus in which ink is supplied, with a hydrostatic pressure, directly from an ink reservoir to a recording head, there are many cases where various difficulties are caused by such an ink pressure change as mentioned above. To cope these difficulties, a constant detection should be made on the liquid pressure of ink stored in a recording head, ink supply system or ink reservoir, and according to the detection signal such a measure as a liquid pressure control, a warning on a liquid pressure abnormality or a print-stoppage should be taken without delay.

In addition to the above, as shown in FIGS. 1 through 3, the liquid pressure detecting means comprising beam 11 and strain gauge 12 each provided onto a recording head has various disadvantages that the strain gauge performance scatter between the individual elements to make adjustment very difficult, the element change with the passage of time is serious, so that a compensation system should be required, the elements are too fine, so that the attachment thereof to the mechanism must need a high accuracy, the elements are expensive, so that the overall cost is raised, and the like.

SUMMARY OF THE INVENTION

The aforesaid detecting means of the invention is to solve the disadvantage of the prior art in which a recording failure is caused by an instable liquid pressure in a recording head.

This invention is to provide the detecting means by which a liquid pressure in the recording head is accurately detected and any liquid pressure abnormality in the recording head, an ink-supply tube and an ink reservoir, any shortage of the residual amount of ink, and the like.

This invention is further to improve the abovementioned disadvantages of the liquid pressure detecting means of the prior art and thus to provide a liquid pressure detecting means or an ink residual amount detecting means each capable of operating stably and of using ink of low cost.

According to this invention, the abovementioned objects can be attained by providing a flexible diaphragm deformable according to ink pressure or ink residual amount to a part of an ink supply system for supplying ink from an ink reservoir to an ink jetting system, and by arranging in the vicinity of the flexible diaphragm at least one out of a vibration element, a photodetector, a magnetic sensitive element, and an electrostatic capacity detector to serve as a detecting means for detecting the displacement of the flexible diaphragm.

One of the particularly preferable embodiments of this invention may be attained by arranging the flexible diaphragm and the detecting means to at least one place out of the places of the ink supply system, namely, the recording head, the ink reservoir, and the ink supply tube.

This invention has a great advantage that the amount of ink stored in a recording head can be accurately and readily detected when the amount thereof is going to be used up, without depending upon the ink density and the environmental temperatures. In particular, the reliability and cost-performance are suitable for putting in practical use because the sensitivity and accuracy of detection are high and the temperature characteristics are also excellent.

DETAILED DESCRIPTION OF THE INVENTION

This invention will become more apparent in the detailed description and examples which follow.

Figure 1:
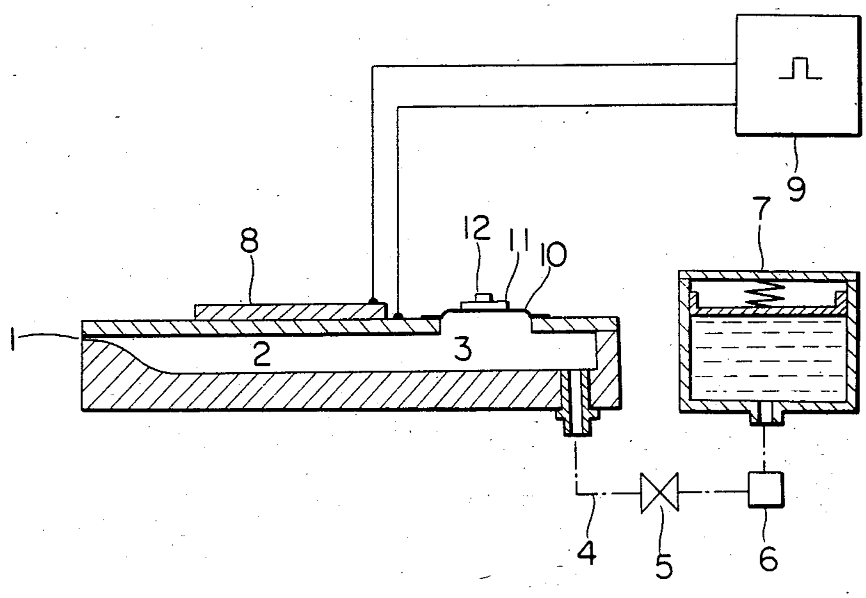
FIG. 1 (PRIOR ART)
FIGS. 1 and 2 are the typical schematic illustrations showing an on-demand type ink-jet recording apparatus, respectively, out of which the former shows a sectional view thereof and the latter shows a plan view thereof.
Figure 2:
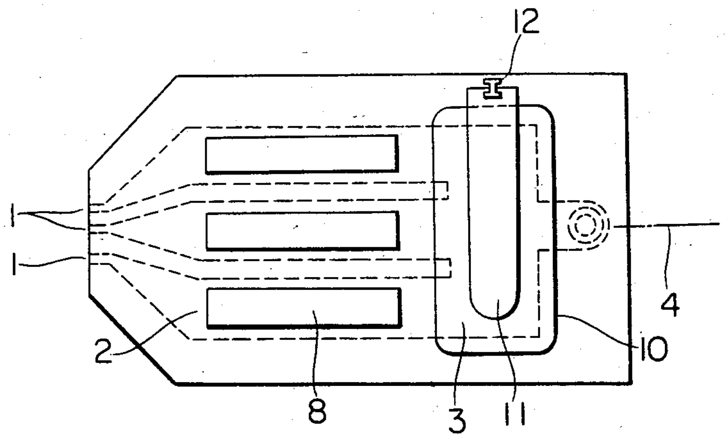
FIG. 2 (PRIOR ART)
Figure 3:
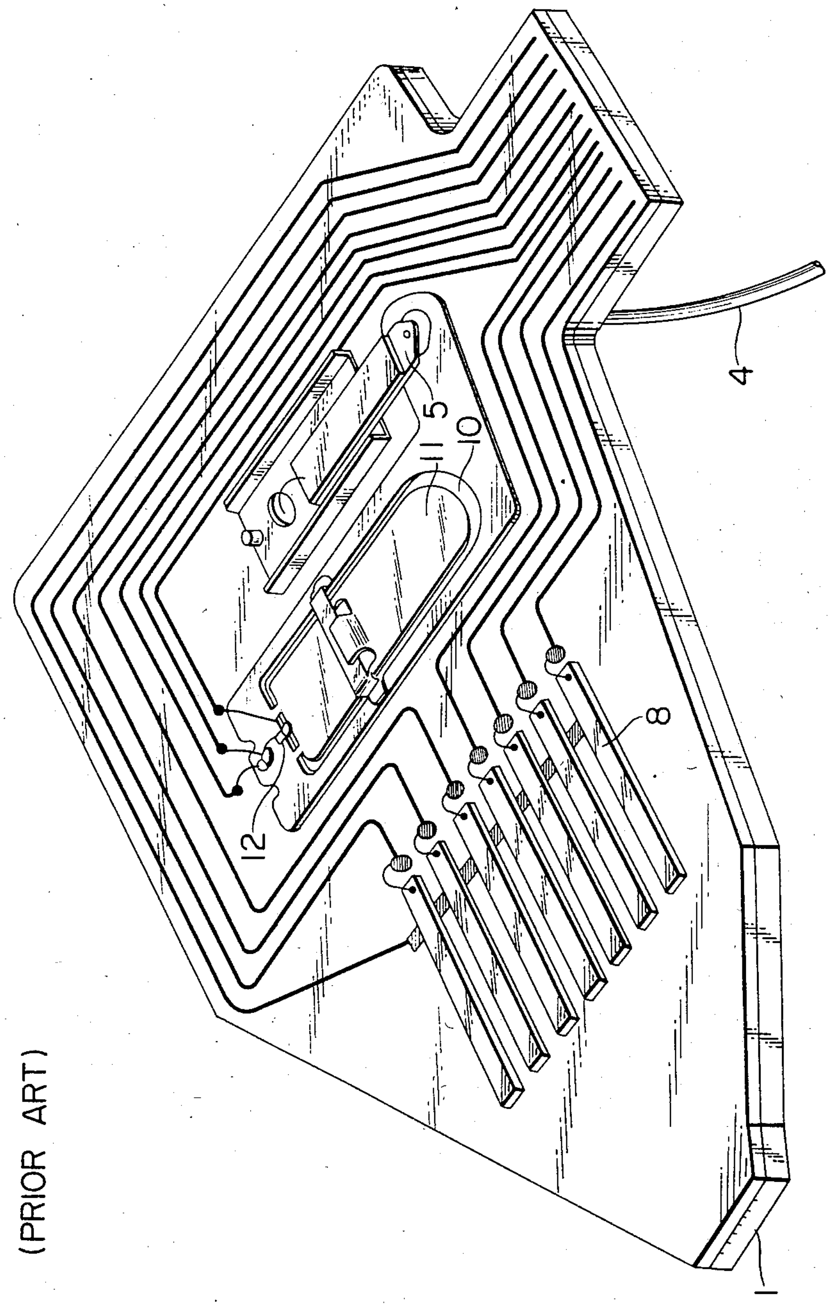
FIG. 3 (PRIOR ART)
FIG. 3 is a perspective view showing a concrete construction of the above-illustrated ink-jet recording apparatus.
Figures 4, 5:
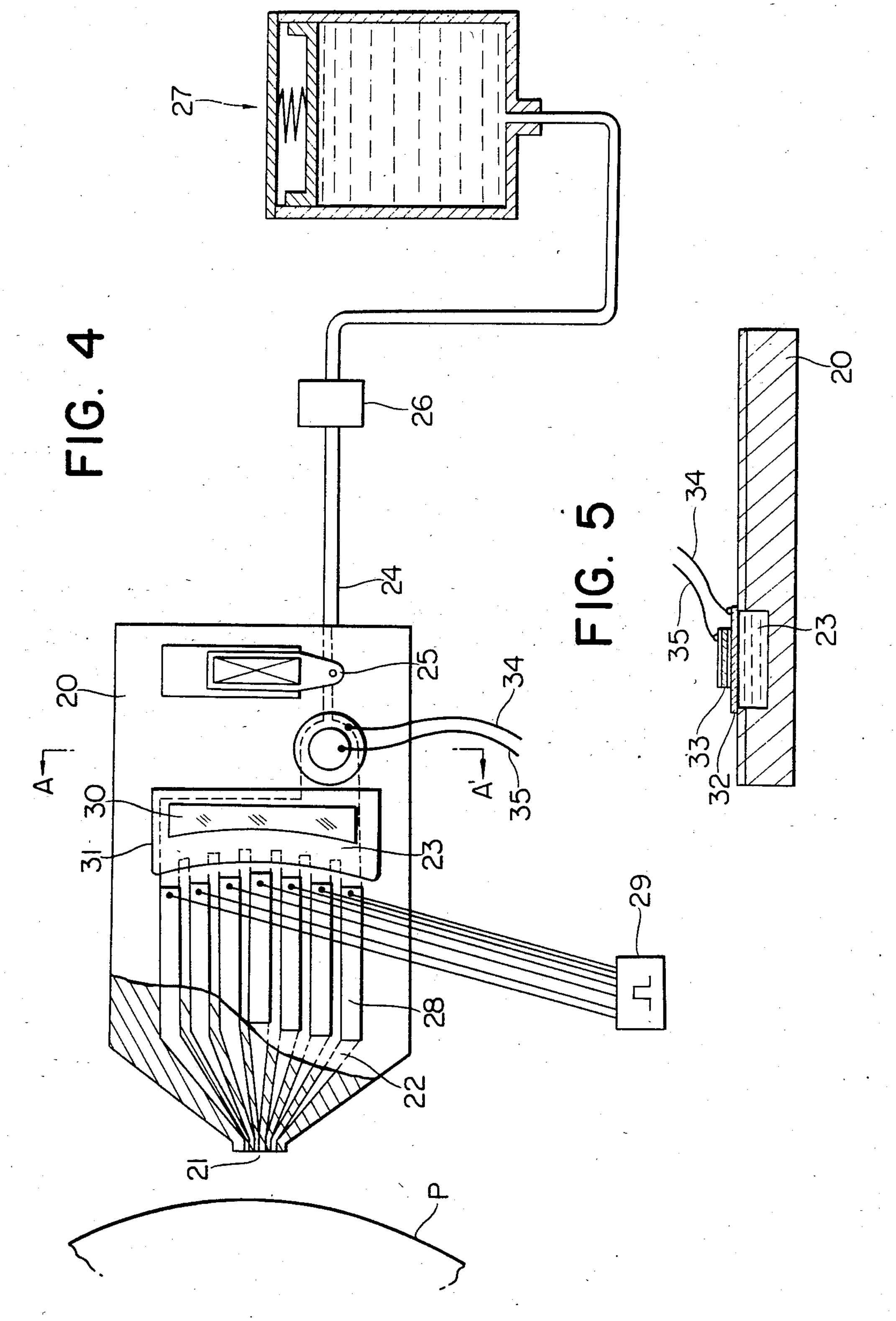
FIG. 4 is a typical side sectional view showing an ink-jet recording apparatus of the invention in which a vibration element is used.
FIG. 5 is a sectional view showing a liquid pressure detecting means of a recording head of the invention.

FIG. 4 is a side sectional view showing a recording head of the invention incorporated therein a built-in liquid pressure detecting means, and an ink-supply system.

FIG. 5 is a section taken on line A–A' in FIG. 4.

A recording head comprises at least one piece of nozzles for jetting ink-droplets, pressure chambers 22 of the same number with the number of the nozzles 21 each connected to the corresponding pressure chamber 22, and common ink-chamber 23 for receiving ink from ink-cartridge 27 and distributing it to the respective pressure chambers 22. Recording ink is filled up in ink-cartridge 27 and is then supplied therefrom, through filter 26 and valve means 25 and by way of ink-supply tube 24, to the described common ink chamber 23 provided into the recording head. Ink is branched and supplied from common ink chamber 23 to a plurality of pressure chambers 22 respectively connected to a plurality of nozzles 21 each corresponding to the image-elements in the vertical direction of a recording image.

A part of the outer wall of each pressure chamber 22 is attached with a piezoelectric transducing element 28 which is electrically connected to electron pulse generator 29. The piezoelectric transducing element 28 comprises a suitable flexible plate, e.g., a piezoelectric crystal, which may be bent inward pressure chamber 22 at the time when an electric signal is received from the generator 29.

In a recording head constructed as mentioned above, piezoelectric transducing element 28 is rapidly bent inward pressure chamber 22 by receiving an electric signal generated from the generator 29. Thus caused reduction in the volume of pressure chamber 22 makes ink of the recording head into ink-droplets to jet out and fly from nozzle 21 onto the facing recording paper P so as to attain a dot-recording.

In the meanwhile, the described common ink chamber 23 of the recording head has an opening on the upper part thereof. Flexible diaphragm 30 is attached to the opening so as to cover the opening to form a flexible upper wall of the common ink chamber 23. Thereby, the ink in the common ink chamber 23 is tightly closed. To the upper surface of the flexible diaphragm 30, a regulator frame 31 is attached. This regulator frame 31 has an opening at which a part of the flexible diaphragm 30 is exposed to the air.

By the abovementioned construction comprising common ink chamber 23 and an exposed part of flexible diaphragm 30, the so-called channel interruption phenomenon in which pressure waves produced in a plurality of pressure chambers at the time of recording may pass around the other pressure chambers can be prevented. There is a little change of the liquid pressure of common ink chamber 23 caused by a change in ink volume suffered with the variations of temperature and humidity or by a change in liquid pressure suffered with the variations of the amount of ink supplied from the ink reservoir through a valve means. The abovementioned flexible diaphragm 30 can also effectively works to absorb and adjust such a little change of the liquid pressure in common ink chamber 23. To be more concrete, when the liquid pressure of common ink chamber 23 is increased a little, the flexible diaphragm 30 is inflated a bit, and the volume of the common ink chamber is thereby expanded a little so that the specified liquid pressure may be maintained. On the contrary, when the liquid pressure is decreased a little, the flexible diaphragm 30 is caved in a little so that the specified liquid pressure may also be maintained.

As for the materials to be used for the flexible diaphragms 30, there may be used single materials of thin film and laminated substances each made of such a plastic material as vinylidene chrolide, polyethylene, Nylon, polypropylene and the like. There may also be used such a material that a metallic thin film such as aluminium thin film is laminated or evaporated onto the abovementioned materials.

It is also effective to apply a heat treatment in advance to the described flexible diaphragm 30, because it can be considered that the flexible diaphragm 30 may possibly be deformed by heat when applying a thermosetting treatment after it is attached to the head substrate and to regulator frame 31.

Now, a flexible plate 32 for detecting a liquid pressure is provided to the opening portion which is made on an ink chamber and is made a part of or extended part of the described common ink chamber 23, so as to be in a tightly closed state. This flexible plate 32 comprises a metallic thin plate made of stainless steel, brass, phosphor bronze, Kovar or the like, and may be applied by a stainless treatment if required.

A vibration element 33 is tightly attached to the outer surface of the flexible plate 32. The vibration element 33 is a piezoelectric type vibration element for example, and inter alia, a crystal vibrator or a ceramic vibrator is used for this purpose. When an A.C. voltage is applied to this piezoelectric type vibration element 33, the diameter of this vibration element 33 is expanded and constructed. However, it is pasted on a surface of the metallic flexible plate 32, so that it causes a distorted vibration together with the metallic flexible plate 32, and thus, both of 32 and 33 form an electric striction vibrator. 34 and 35 are the lead wires respectively connected to the flexible plate 32 and vibration element 33, and the other end thereof is connected to a driving circuit.

Figure 6:
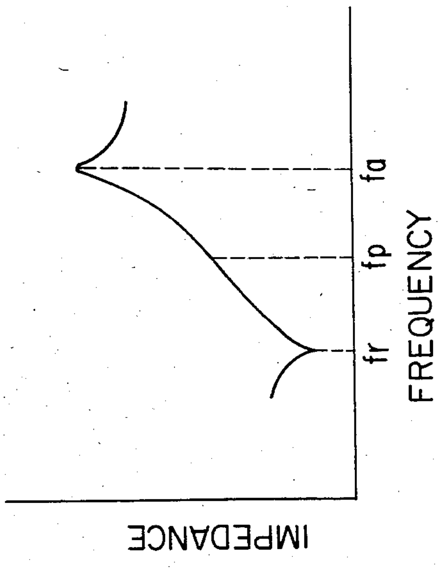
FIG. 6 is a graphical representation showing the characteristics of an electro-striction vibrator relating to the invention.

FIG. 6 shows the characteristics of the aforementioned electric striction vibrator. This electric striction vibrator has a resonance point in a specific frequency band, and it becomes electrically equivalent to an LCR filter combined with an inductance L, an electrostatic capacity C and an electric resistance R. In this electric striction vibrator, the frequencies of the resonance point and the antiresonance point thereof and the impedance thereof are varied according to the changes of the liquid pressure of ink coming into contact therewith. Therefore, when an excitation frequency is chosen as the frequency fp between a resonance point fr and an antiresonance point fa under a specified liquid pressure, such impedance is varied in correspondence to the liquid pressure. In other words, when an impedance is measured, a liquid pressure may be obtained, provided that an excitation frequency shoud be chosen so as not to occur any resonance and antiresonance phenomena in an fp within the range of liquid pressures to be used.

Figure 7:
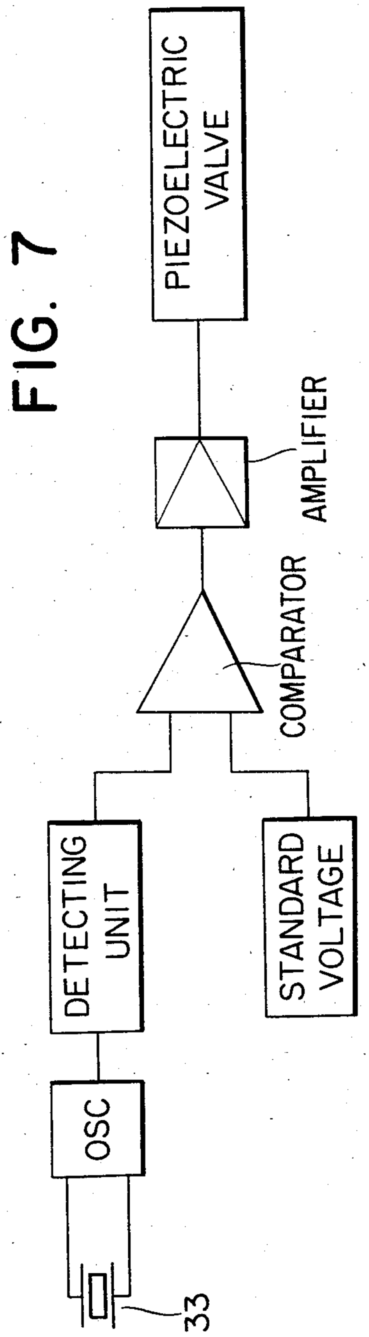
FIG. 7 is a block diagram showing the operation of the electrostriction vibrator.

FIG. 7 is a block diagram showing the operation of the described electric striction vibrator. A signal having the aforementioned specified frequency is given from an oscillator OSC generating continuously a series of vibrations each having constanct waveform, frequency, and amplitude, so that the electric striction vibrator may be excited. As described above, such impedance is varied according to the liquid pressures of common ink chamber 23, and the amplitude of the signal of constant frequency is therefore varied according to the liquid pressures. A signal having a D.C. voltage corresponding to a liquid pressure may be obtained by detecting this amplitude variations with a detector. The signal thus obtained is binary-signalized by comparing the D.C. voltage of the obtained signal with the reference voltage corresponding to the specified liquid pressure by making use of a comparator. The binary signal is amplified by an amplifier to apply to a valve means 25 such as a piezoelectric valve. The valve means 25 operates, for example, a piezoelectric valve opens when a liquid pressure is lower than the specified pressure level, and closes when it is higher. When opening this valve, ink is supplied from ink reservoir 27 to common ink chamber 23 through filter 26 and ink-supply tube 24. When closing the valve, ink is stopped to supply. With the consumption of ink made by jetting out, the relative replenishment of ink is intermittently and timely made so as to constantly maintain a liquid pressure of common ink chamber to the specified pressure level.

The abovementioned liquid pressure detecting means can be utilized for detecting an ink residual amount when it is attached to a hydrostatic type ink-jet recording apparatus. In a recording apparatus of this kind, generally, no valve means 25 for adjusting liquid pressures is provided, and ink reservoir 27 is directly connected to common ink chamber 23, so that ink may be maintained under the same hydrostatic pressure level. In this case, for instance, when an ink residual amount is in short in the ink reservoir, the pressure starts to drop rapidly. To cope therewith, a reference voltage is prescribed in advance corresponding to the liquid pressure dropped. When a liquid pressure detecting means comprising the aforementioned electric striction vibrator detects that such dropped pressure becomes lower than the reference level, then a warning is given or a recording is stopped in operation.

Figures 8, 9:
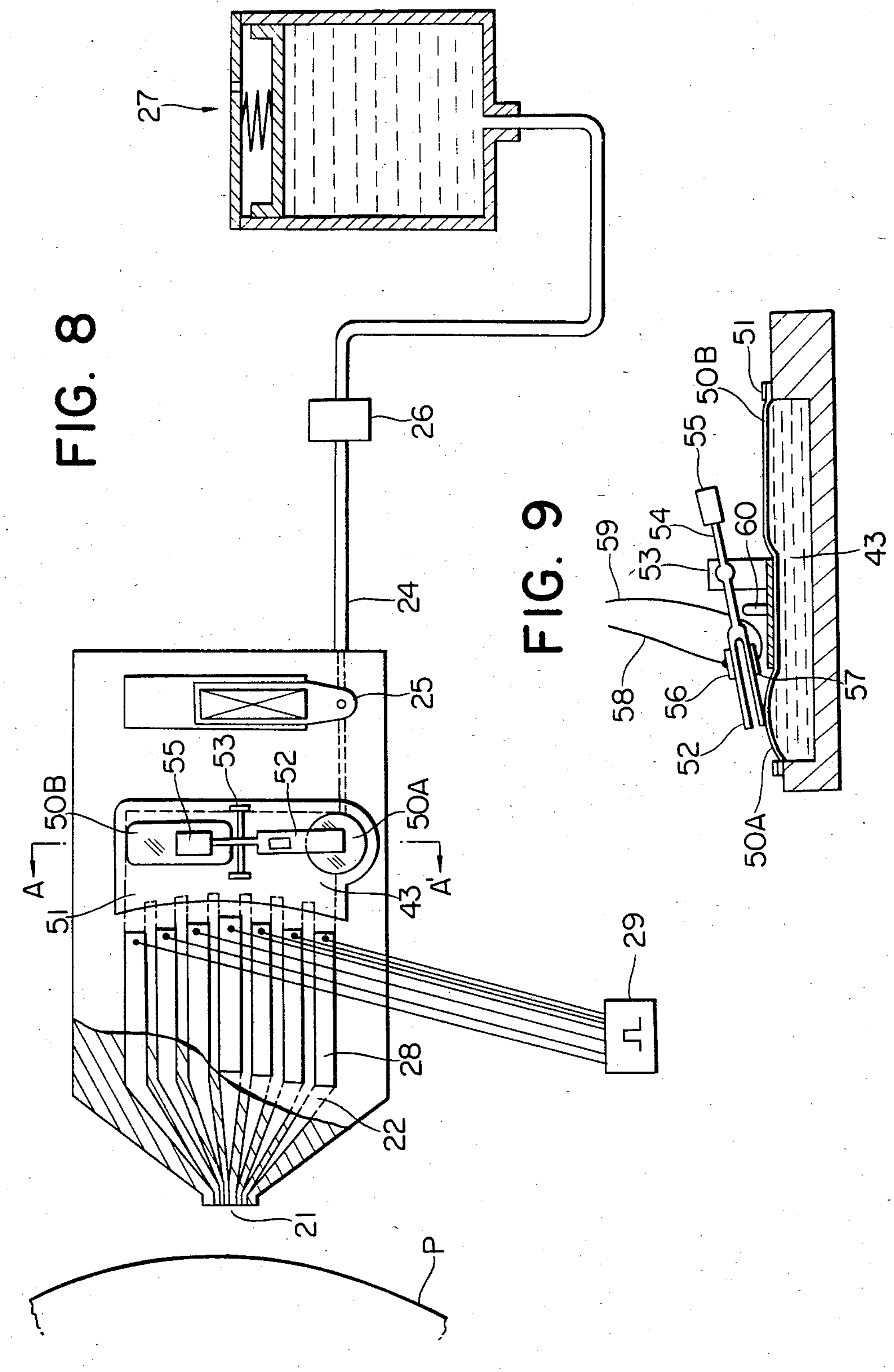
FIGS. 8 and 9 are the sectional views of a recording head being provided with a liquid detecting means embodied in another example of the invention, respectively.

FIG. 8 is a side sectional view of a recording head with a built-in liquid pressure detecting means, and an ink-supply system, of another example of the invention.

FIG. 9 is a sectional view of the above -illustrated recording head taken on line A–A' in FIG. 8.

In both of these drawings, an opening is made on the upper part of common ink chamber 43 which distributes and supplies ink from ink-reservoir 27 to the described pressure chambers 22 through a valve means 25. Flexible diaphragm 50 is attached to the upper part of the common ink chamber 43 so as to cover the opening and to form a flexible upper wall of the chamber 43, so that ink is sealed in the common ink chamber 43. Onto the flexible diaphragm 50, a regulator frame 51, is attached. This regulator frame 51 has two openings. One opening is used for detecting a liquid pressure of ink of common ink chamber 43, and a part of the flexible diaphragm 50 is exposed to the opening to form a soft, flexible liquid pressure detector 50A. Another opening is provided for preventing a passing-around of pressure waves (i.e., a channel interruption phenomenon) caused inside the common ink chamber 43 at the time of recording, and for adjusting liquid pressure of the recording head to form a soft requlator 50B by exposing a part of the flexible diaphragm 50 to the air through the opening.

Thus, a part of flexible diaphragm 50 serves as the liquid pressure detecting unit 50A and the regulator unit 50B for buffering pressure waves and for adjusting liquid pressure. These units are respectively constructed to be able to displace corresponding delicately to an ink pressure of the recording head.

As for the materials to be used for such flexible diaphragms 50, single thin films or laminated layers of such a plastic as polyvinylidene chloride, polyethylene, Nylon, polypropylene or the like. There may also be used as flexible diaphragms, such as a diaphragm thin plate comprising the above-mentioned plastic plate laminated thereon with a thin aluminium or stainless steel plate, a diaphragm thin plate comprising a thin metal plate made of stainless steel, brass, phosphor bronze or the like surface-treated thereon.

A tuning fork vibrator 52 is arranged onto this flexible diaphragm 50. A supporting shaft 53 for rotation is provided to the upper part of the regulator frame 51 to make arm 54 free to rotate. The arm 54 is arranged with the supporting shaft 53 to the middle thereof, the tuning fork vibrator to one end thereof, and as balancer 55 to the other end thereof so as to keep balance.

Next, the tuning fork vibrator 52 has a pair of arms which vibrate at the respective inherent vibration frequencies depending upon the sizes and configutations of the arms as is well-known. The vibration frequencies are accurate and stable. As for the materials thereof, there may be used such an alloy of iron, nickel, elinvar or the like, barium titanate porcelains and the like.

A mechanical filter is formed by attaching an exciting piezoelectric element 56 to one of the arms of this tuning fork vibrator 52 and a vibration receiving piezoelectric element 57 to the other arm thereof each of which is connected respectively to an oscillating circuit. 58, 59 each are lead wires connecting the piezoelectric elements to the oscillating circuit. In this case, the tuning fork vibrator 52 is connected by itself to a grounding circuit.

On the other hand, the tip of the tuning fork vibrator 52 does not come into contact with the liquid pressure detector 50A but has a space between the two when a liquid pressure is not higher than the specified liquid pressure, that is, when the position of the liquid pressure detector 50A of flexible diaphragm 50 is not higher than the specified height. Then, when the liquid pressure becomes higher than the specified pressure and the flexible diaphragm 50 is expanded to protrude the liquid pressure detector 50A, then, 50A and the tip of the tuning fork vibrator 52 are relatively positioned so as to come into contact with each other. Should there be bubbles or solid matters inside an ink flow passage and particulaly inside a nozzle 21 of a recording head, the so-called a purging operation has to be made, in which such an obstacle is purged to discharge together with ink by making ink of a high pressure with a rush from the ink flow passage into the nozzle 21. In this case, however, the liquid pressure of common ink chamber 43 becomes much greater than the specified pressure at the time of recording, and the liquid pressure detector 50A of the flexible diaphragm 50 protrudes outward excessively to give a strong pressure to the tip of the tuning fork vibrator 52, so that there may be some instances where the flexible diaphragm 50 and the tuning fork vibrator 52 may be broken down. To prevent such a trouble, the tuning fork vibrator 52 should be brought into contact with liquid pressure detector 50A of flexible diaphragm 50 by energizing a spring (not shown). When the liquid pressure raises higher than the specified pressure, the 50A is ascended to give the tuning fork vibrator 52 a constant contact pressure from the spring. Further, when the liquid pressure is rapidly increased by the abovementioned purge or the like to expand the flexible diaphragm 50 and to give the spring a pressing force of a specific pressure or more, then the tuning fork vibrator 52 and the arms 54 are rotated about the described rotation supporting shaft 53. Thus, the tuning fork vibrator 52 energized by the spring is protected by the shock abrorbing effect of the spring and the rotation shunting movement of the rotation supporting shaft 53, therefore, any abnormality or trouble such as a breakdown and the like is not taken place.

Numeral 60 is a stopper provided onto regulator frame 51 so as to be attachable to and detachable from the arm 54. When an ink-pressure of common ink chamber 43 is equivalent to a specified pressure, the stopper 60 is designed to adjust the height or angles of the arm 54 so that the tip of the tuning fork vibrator 52 can come into contact with the flexible diaphragm 50A.

Flexible diaphragm 50A, tuning fork vibrator 52, arm 54 and stopper 60 are constructed as mentioned above. Accordingly, when a liquid pressure of common ink chamber 43 is not higher than a specified pressure, the flexible diaphragm 50A is in a relatively lower position and the arm 54 hits against the stopper 60 to stay under the prescribed position. Therefore, the tip of the tuning fork vibrator 52 is separated from the flexible diaphragm 50A and thus the tuning fork vibrator 52 is excited by an exciting circuit to vibrate in a certain frequency. When a liquid pressure raises over the prescribed pressure level to ascend flexible diaphragm 50A so as to come into contact with the tip of tuning fork vibrator 52. The vibration of tuning fork vibrator 52 is absorbed by flexible diaphragm 50A to stop in motion. As described above, the driving of a piezoelectric valve, i.e., a valve means 25, is controlled by detecting with a circuit similar to that shown in FIG. 7 the excitation or the stop in motion, that is the variation of the amplitude, of tuning fork vibrator 52.

Figure 10:
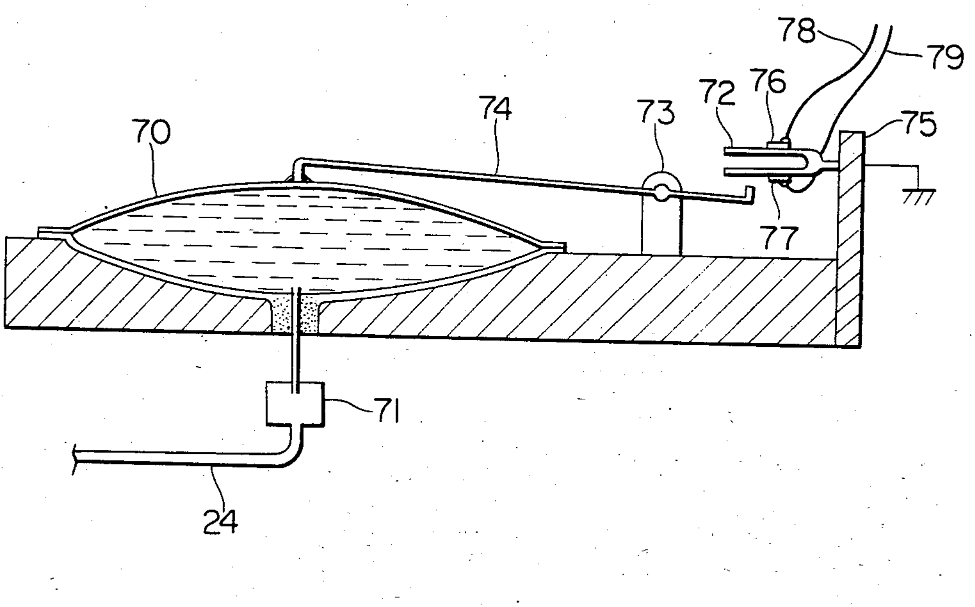
FIG. 10 is a sectional view showing an ink reservoir being provided with an ink residual amount detecting means embodied in another example of the invention.

FIG. 10 shows an example of the invention, in which an amplitude variation detecting means of the invention is used for detecting the ink residual amount of an ink cartridge. In this drawing, a part of an ink container bag closely containing recording ink forms a flexible diaphragm 70, and the outside thereof is in a hydrostatic or pressurized state. Ink of the ink container bag is replenished to a recording head through a detachable ink connector 71 and ink-supply tube 24, as the ink is consumed in the recording head (not shown). Accordingly, the flexible diaphragm 70 forming a part of the ink container bag is in a relatively higher position when ink is filled up in the initial stage, however it gradually descends with the flow-out of the ink from the bag and lastly reaches the final position where the ink cannot be supplied under a prescribed pressure. Ink residual amount detecting means of the invention is that for detecting a liquid level of the time described above, that is, for detecting a certain final position of the flexible diaphragm 70.

To the approximate central portion of the upper surface of this flexible diaphragm 70, one end of arm 74 is attached. This arm 74 is rotatable around rotation supporting shaft 73 as the supporting point, and the other end thereof is so arranged as to face tuning fork vibrator 72. Two arms of this tuning fork vibrator 72 are provided with an exciting piezoelectric element 76 and a vibration receiving piezoelectric element 77, respectively, and an oscillating circuit is connected thereto through the respective lead wires 78, 79. In this case, the mechanism is to be constructed in the manner that tuning fork vibrator 72 itself is connected to a grounding circuit, and one end of the arm 74 which is on the side of the tuning fork vibrator 72 does not come into contact with the tuning fork vibrator 72 but is separated with a space therefrom when ink is ordinarily supplied, however, when ink in an ink cartridge is consumed and the ink residual amount therein becomes less than a prescribed amount, flexible diaphragm 70 descends and one end of arm 74 comes into contact with tuning fork vibrator 72 to stop the vibration of the tuning fork vibrator 72 in motion.

This tuning fork vibrator 72 is driven by an oscillator generating a given frequency, and when the amplitude thereof is suddenly reduced by the abovementioned contact, a detection is made on the shortage of residual amount of ink to drive such an external operation as a warning of the shortage, a signal for stopping the print operation or the like.

This invention shall not be limited to the abovegiven examples and it is however to be understood that modifications may be made without departing from the true scope of the invention. For example, the invention may also be embodied in the manner that a detecting element displacing corresponding to the displacement or deformation of a flexible diaphragm is energized by a spring and is then brought into contact with the flexible diaphragm. By such a construction as described above, a system for being detected and a detecting system can be separated from each other, and if necessary the detecting system can be replaced.

This invention further features a concrete detecting device using therein a photointerruptor to serve as a means for detecting the displacement of the abovementioned flexible diaphragm. This means is very effective to solve the disadvantage in the prior art that an erroneous recording is caused by an instable liquid pressure of a recording head.

In this invention, there can be provided a means capable of detecting accurately a liquid pressure of a recording head, and of detecting a possible abnormality of liquid pressure, the shortage of ink residual amount and the like in the recording head, an ink-supply system and an ink reservoir.

Figure 11:
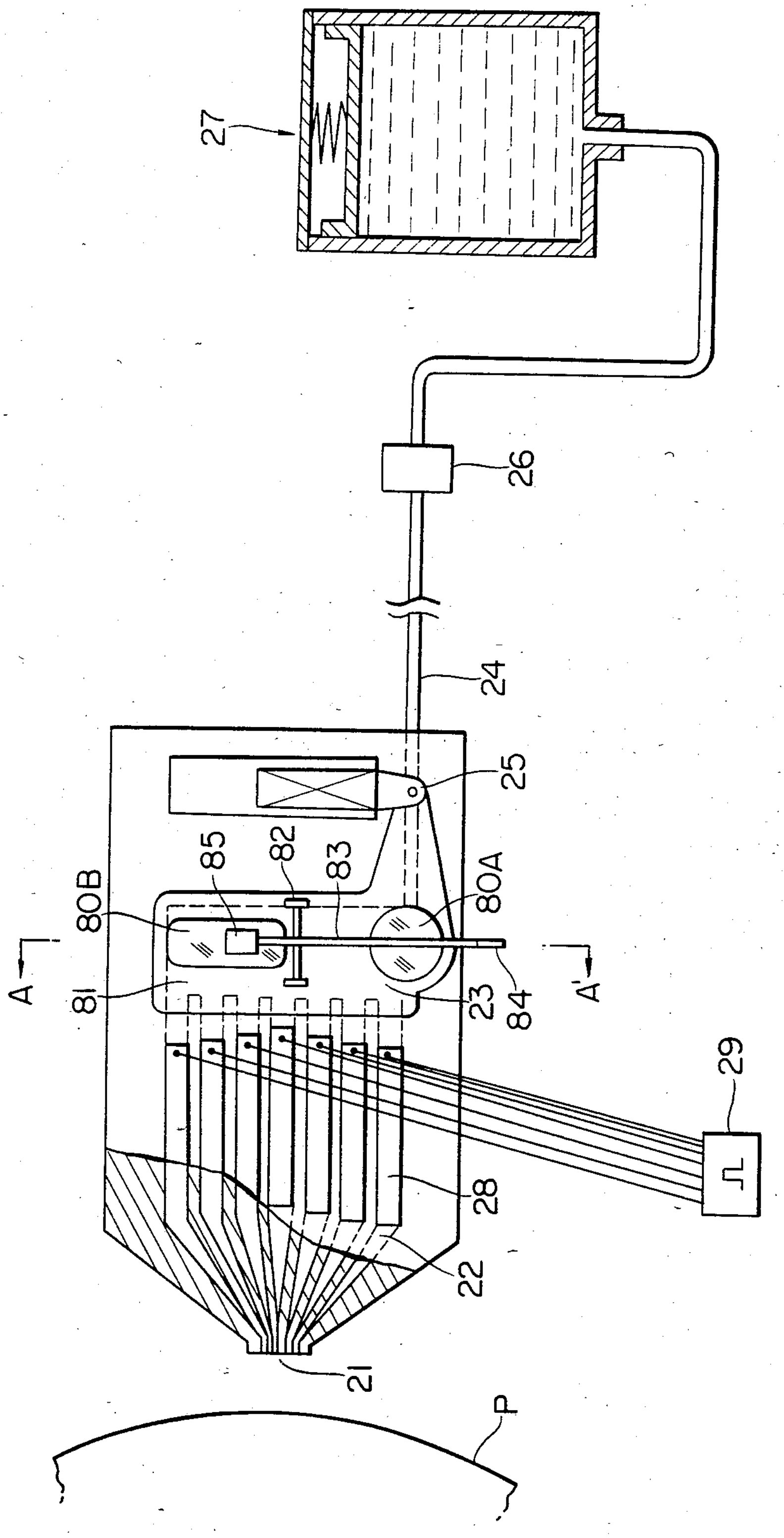
FIG. 11 is a typical sectional view showing an ink-jet recording apparatus of the invention in which a photodetector is used.

This invention will become more apparent in the detailed description and another example which follow:

FIG. 11 is a side sectional view showing a head and an ink-supply system with a built-in liquid pressure detecting means of the invention.

Figure 12:
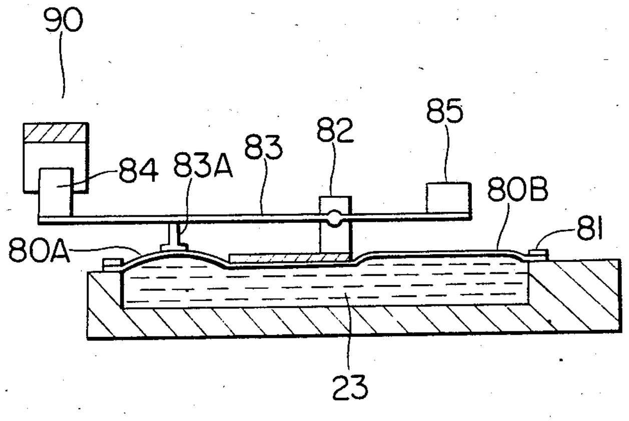
FIG. 12 is a sectional view showing a liquid pressure detecting means of a recording head of the invention.

FIG. 12 is a sectional view taken on line A–A' in FIG. 11.

In the above drawings, the elements similar to those shown in FIG. 8 are given like reference numerals or characters.

The upper part of the abovementioned common ink chamber 23 of the recording head has an opening which is attached with and is covered by a flexible diaphragm 80 to form a flexible upper wall of the common ink chamber 23 so as to tightly seal ink inside the common ink chamber 23. A regulator frame 81 is attached to the upper part of the flexible diaphragm 80. The regulator frame 81 has two openings. One opening is for detecting a liquid pressure of the common ink chamber 23, and a part of the flexible diaphragm 80 is exposed to this opening to form flexible liquid pressure detector 80A. The other opening is provided for preventing the aforesaid channel interruption phenomenon caused in the common ink chamber and for adjusting liquid pressure of the recording head every time of recording. A part of the flexible diaphragm 80 is exposed to the air through this opening to form a flexible regulator 80B.

Thus, the part of flexible diaphragm 80 is formed to serve as liquid pressure detector 80A and regulator for buffering pressure waves and for adjusting the liquid pressure. These 80A and 80B are so formed respectively as to displace in sensively response to ink pressure of the recording head.

As for the materials to be used for the flexible diaphragms 80, there may be used a single material of a thin film or a laminated material made of plastics such as vinylidene chloride, polyethylene, Nylon, polypropylene or the like. There may also be used the abovementioned materials each further laminated or evaporated thereon with such a metallic thin layer as an aluminium layer. In addition, it is also effective to apply a heat treatment in advance to the flexible diaphragm 80, taking a possible heat deformation into consideration in the case that the flexible diaphragm 80 is attached to a head body and the regulator frame 81 and is then hardened by heat. Next, a rotation supporting shaft 82 is provided to the upper part of the regulator frame 81 and arm 83 is made freely swing able. A part of the arm has a connector 83A which is in the state that it is attached to the surface of the liquid pressure detector 80A of the flexible diaphragm 80. A light shielding plate 84 is fixed to the tip of the arm 83. Another tip of the arm 83 is attached with a balancer 85 that compensates the deviation by weight of the arm 83 and the like to keep a balance, so that the balancer can improve the accuracy of liquid pressure detection. Accordingly, it is not required to use any balancer 85, if the arm 83 is light enough or according to the configuration of the arm 83. The arm 83 is vibrated with an acceleration applied to a recording head by the operation of a carriage return or the like when recording. One of the effectes of this balancer 85 is that such vibration of the recording head can be prevented by keeping the balance of the arm 83.

In the neighborhood of the light shielding plate 84, there is fixed to the recording head or the like with a photodetector 90 incorporated therein with a light emitting element and a light receiving element, such as a photointerruptor that is a transmission type optical coupling element, and the light shielding plate 84 is so arranged as to shield the optical path of the photodetector 90. The optical path of the photodetector 90 is formed without intervening the shielding plate 84 when the liquid pressure of the recording head becomes not higher than a specified pressure and the expansion of the liquid pressure detector 80A of the flexible diaphragm 80 descends, and the path is shielded when the liquid pressure becomes not lower than the specified pressure and the expansion of the liquid pressure detector 80A of the flexible diaphragm ascends.

Figure 13:
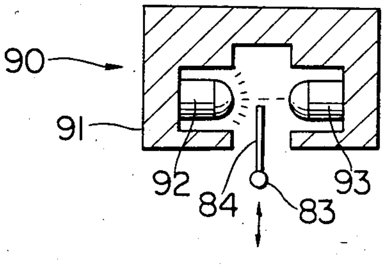
FIGS. 13 and 14 each are the illustrations of the construction of a photodetector relating to the invention, respectively.

FIG. 13 is a sectional view of a photodetector 90 relating to the invention. Wherein, a light emitting element and a light receiving element are incorporated so as to be face to face into a detector body 91 to form into an optical path for detection. The optical path is shut off and transmitted to turn ON and OFF the electric current when moving up and down the light shielding plate 84 provided in the path and attached to the tip of the arm 83 which is swingable in response to a liquid pressure.

The movable light shielding plate 84 provided onto the recording head and the photodetector 90 are correlatively disposed and a light emitted from the light emitting element 92 is thereby induced into or shut off from the light receiving element 93 according to the levels of liquid pressure detector 80A of the flexible diaphragm 80, so that an output signal (of a photoelectric current) is dispatched to a driving control circuit. In the driving control circuit, the signal is made binary, amplified and then applied to a piezoelectric conversion element of valve means 25. If the surface of the liquid pressure detector 80A of the flexible diaphragm 80, that is, the liquid level of common ink chamber 23, is relatively low and the liquid pressure is not higher than the specified pressure, then the valve means 25 operates to open. If the surface of liquid pressure detector 80A of the flexible diaphragm 80 becomes in an expanded state and the liquid pressure is not lower than the specified pressure, then the valve means 25 operates to close.

Figure 14:
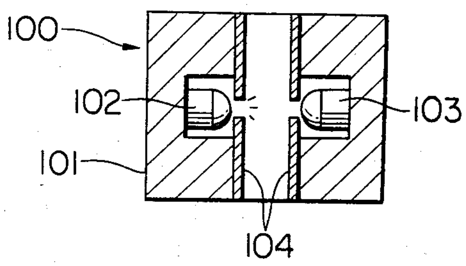

FIG. 14 is a sectional view of a photodetector 100 relating to the invention, which is characterized in providing a pin-hole plate 104 having a pin-hole on an optical path for detection comprising a light emitting element 102 and a light receiving element 103. With this photodetector, it is possible to prevent the influence of the deterioration on a standing of the parts forming the detector, to eliminate the difference between the individual parts caused by the scattering of the parts quality, and to reduce the adjustments in manufacture.

Figure 15:
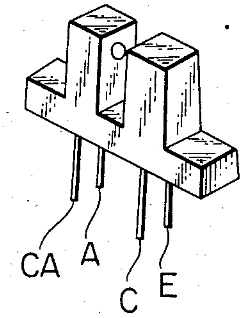
FIG. 15 is an outer appearance illustration of a photointerruptor relating to the invention.

FIG. 15 is an outer appearance illustration of a photointerruptor which is one of the concrete examples of the photodetector 90 or 100; wherein, a light emitting diode (LED) having anode A and cathode CA, and a phototransistor forming a light receptor having collector C and emitter E, are incorporated into one body.

Figure 16:
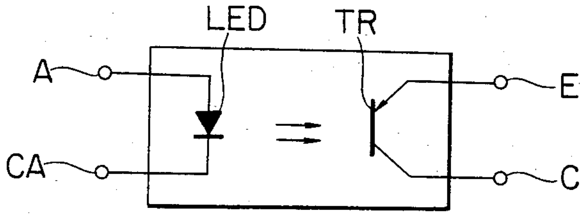
FIGS. 16 and 17 are the internal wiring diagrams of the photointerruptor respectively.

FIG. 16 is an internal wiring diagram of the above-shown photointerruptor, wherein, the light emitted from the light emitting diode(LED) is desired to be an infrared ray or red ray of light which is not affected by an exterior light. And, TR indicates a phototransistor or a photodiode.

Figure 17:
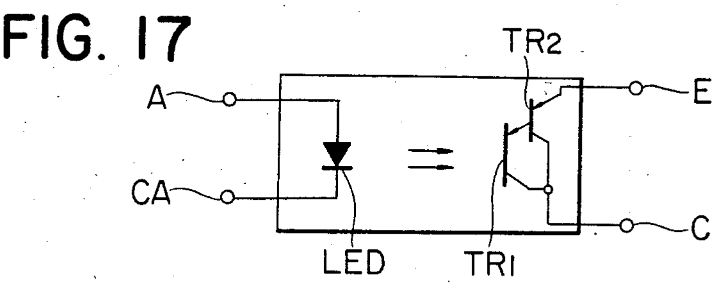

FIG. 17 shows a photointerruptor of a transmission type photo-coupling element corporated with an infrared light emitting diode LED and a Darlington type highly sensitive phototransistor. This is formed by connecting a phototransistor $TR_1$ to a transistor $TR_2$ as shown in the drawing, and is characterized in that the whole electric current amplification factor becomes a product of the respective electric current amplification factors of the two pieces of the transistors, and the transfer current ratio is great.

Figure 18A:
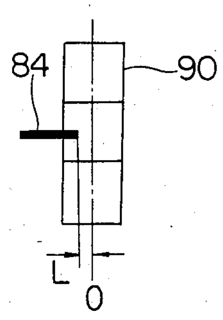
FIG. 18A and B is an illustration of the characteristics of a photointerruptor relating to the invention.
Figure 18B:
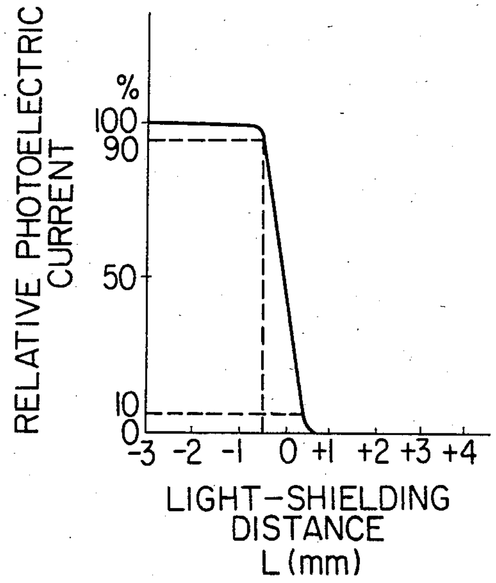

FIG. 18 is an illustration of the characteristics of a photointerruptor. FIG. 18 (A) shows an interrelationship between the position of photointerruptor 90 and that of a a light shielding plate 84, in which L represents a light shielding distance from the light path center of the photointerruptor 90 to the front edge of the light shielding plate 84. FIG. 18 (B) is a graph expressing the relationship between the light shielding distance L and a relative photoelectric current, and the graph shows a light is completely transmitted or shielded when the light shielding distance is $\pm 0.5$ mm.

Figure 19:
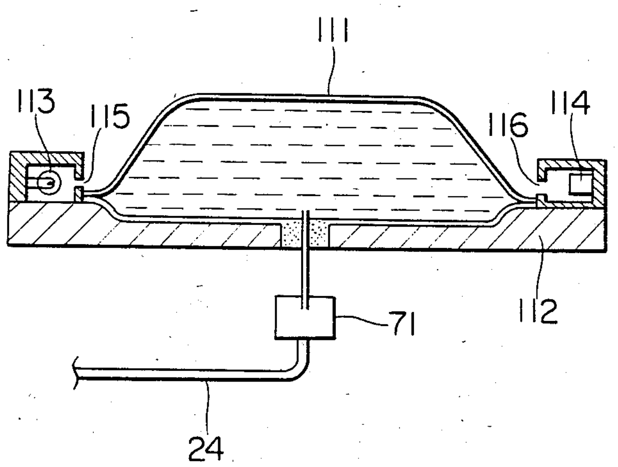
FIGS. 19 and 20 are the sectional views showing respectively the examples of the ink residual amount detecting means of the ink-cartridges relating to the invention.

FIG. 19 shows another example of the liquid pressure detectors of the invention, that is an example of a liquid pressure detector provided into an ink cartridge. This example is of such a type that a flexible diaphragm 111 is provided to a part of an ink cartridge and the height of this flexible diaphragm 111 is detected by a photodetector.

The ink cartridge is made detachable from an ink connector 71, and when the ink cartridge is attached and connected to the ink connected 71, ink stored in an ink container bag having the flexible diaphragm comprising at least a part of the ink cartridge is replenished therefrom and is supplied into a recording head (not shown) through the ink connector 71 and by way of an ink sypply tube 24.

On the other hand, a light emitting element 113 and a light receiving element 114 are provided, face to face with the interposition of the ink cartridge, to a base board 112 to which the ink cartridge is loaded. Numerals 115, 116 are pin-hole plates or condenser lenses respectively provided into the optical path between the light emitting element 113 and the light receiving element 114. Therein, an LED, a small sized electric bulb and the like may be used for the light emitting elements 113, and such a photoconductor as a phototransistor, a solar cell, a selenium photoelectric cell, CdS, and the like may be used for the light receiving elements 114.

According to such a constitution as mentioned above, when there is an enough residual amount of ink in an ink cartridge, the flexible diaphragm is expanded to ascend and the light from the light emitting element 113 is thereby shielded and is unable to reach the light receiving element 114. Therefore, no output signal cah be generated. And, when the residual amount of ink is consumed to reach a level lower than a specified level, the flexible diaphragm 111 is lowered in position to make the light from the light emitting element 113 incident to the light receiving element 114 and an putput signal is thereby generated to drive a necessary step relating to the case in shortage of the ink residual amount, that is, a warning or a stop action for printing operation.

Figure 20:
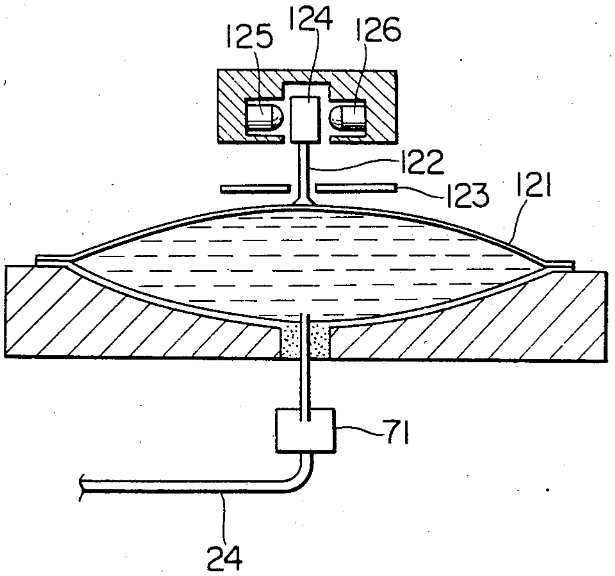

FIG. 20 is a sectional view of an ink residual amount detecting means of a futher example of the invention. The constitution of this case is also to provide a flexible diaphragm 121 to a part of an ink cartridge, and is of such a type that the height of this flexible diaphragm 121 is detected directly by a photodetector.

At least a part of an ink container bag constituting the ink cartridge forms the flexible diaphragm 121 to seal the ink in the container bag. Ink stored in the container bag is then replenished therefrom and is supplied into a recording head (not shown) through ink connector 71 and ink supply tube 24.

On the other hand, a pin 122 is attached to the nearly central point of the upper surface of the flexible diaphragm 121 so that the pin 122 may not be slant by a regulator plate 123, and a light shielding plate 124 is formed on the top of the pin 122. With the interposition of this light shielding plate 124, there is provided a photodetector comprising a light emitting element 125 and a light receiving element 126, that is, a photointerruptor for example, to the both sides of the light shielding plate 124, respectively. According to such a constitution as mentioned above, the variation of ink amount of the ink container bag makes up and down the light shielding plate directly connected to the flexible diaphragm 121, and according to the up and down movement of the light shielding plate 124, the ink residual amount is detected by the photodetector.

As mentioned above, there could be various kinds of means for detecting ink pressure or ink residual amount, besides the examples given herein, by making use of a photodetector of the invention such as a photointerruptor and according to the displacements of a flexible diaphragm provided to an ink-containing recording head, ink-cartridge or ink-supply system, so as to be deformed by coming into contact with ink. They are also characterized in that the detection performance is very accurate and the reliability is excellent, because any pressure is not required for the measurements.

Figures 21, 22:
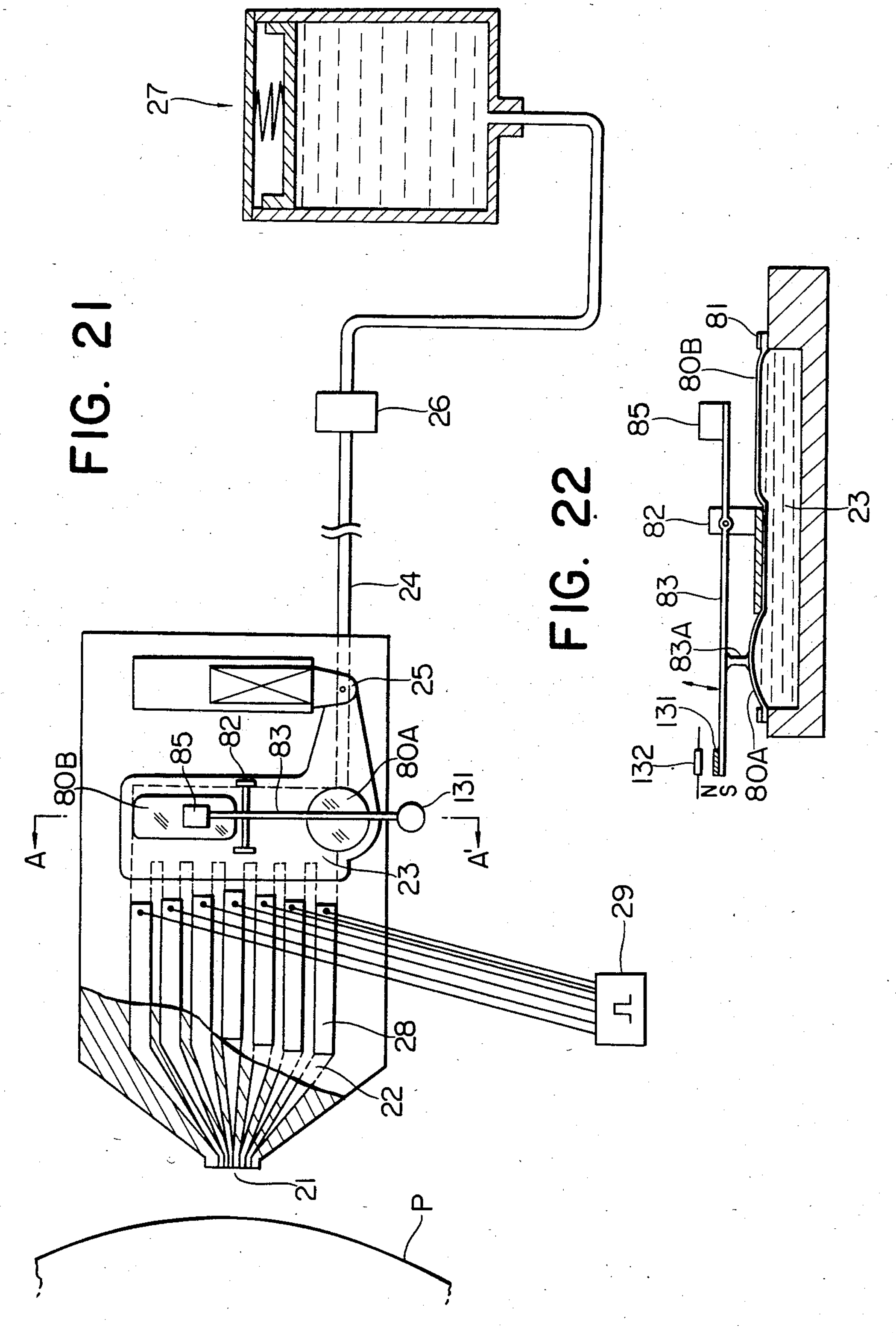
FIG. 21 is a typical side sectional view showing an ink-jet recording apparatus of the invention in which a magnetic sensitive element is used.
FIG. 22 is a sectional view showing a liquid pressure detecting means of a recording head of the invention.

FIG. 21 is a side sectional view showing a still further example of the recording heads and the ink-supply systems with a built-in liquid pressure detecting means of the invention.

FIG. 22 is a sectional view taken on line A–A′ in FIG. 21.

In these FIGS. 21, 22, like or corresponding parts to those shown in FIG. 11 are designated by like reference numerals or characters.

Wherein, a rotation supporting shaft 82 is provided onto the upper part of the aforementioned regulator frame 81 and arm 83 is made freely rotatable. A part of the arm 83 has a connector member 83A which is in the state of being attached to the surface of liquid pressure detector 80A of the flexible diaphragm 80. To the tip of the arm 83 there is fixed a magnetic material 131 such as a magnet. To the other tip of the arm 83, there is attached a balancer 85 so as to be in a balanced state where an influence from the weight of the arm and the like may be removed to improve the accuracy of liquid pressure detection. This balancer 85 may not be necessary to use if the arm 83 is light enough in weight or the configuration thereof is suitable. One of the effects of this balancer 85 and the like is to prevent vibration of the arm caused by an acceleration generated by a carriage return or a reciprocated printing motion of the recording head at the time of recording.

In the neighborhood of the magnetic material 131, a magnetically sensitive element 132 such as a Hall element is fixed to a recording head or the like and 131 and 132 are so arranged as to be face to face with a certain interval. In this case, the magnetic material 131 attached to the tip of the arm 83 is made freely rotatable around the rotation supporting shaft 82. In order to make liquid pressure detection sensitivity higher to sense the height variations of liquid pressure detector 80A of the flexible diaphragm 80, it is desired that, in a height corresponding to a liquid pressure to be used, the magnetic field axis of a magnetic material is to be approximately in line with the axis of the maximum sensitivity of a magnetically sensitive material 132.

Figure 23:
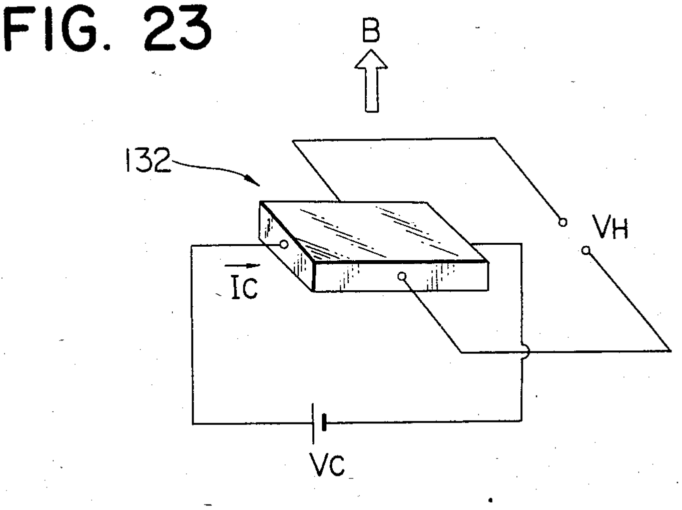
FIG. 23 is an illustration of the effects of a Hall-element relating to the invention.

FIG. 23 is a schematic representation illustrating the effect of a Hall element which is an example of the magneticcally sensitive elements 132 relating to the invention.

Wherein, when a magnetic field B is applied vertically to the direction of electric current IC flowing through the Hall element 132, an electric force works in the vertical direction to both of the electric current IC and the magnetic field to generate an electromotive force, that is, the so-called Hall voltage VH. This phenomenon is called a Hall effect. A Hall voltage may be formulated as follows:

$$VH = RH/t \cdot Ic \cdot B$$

Wherein, RH is a proportional constant specified according to substances; t is a thickness of a Hall element; Ic is a control current; and B is a magnetic flux density As shown in this formula, Hall voltage VH is in proportion to magnetic flux density B if RH·t·Ic is fixed.

Figure 24:
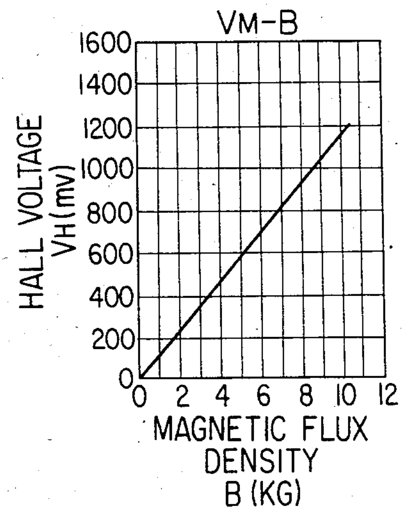
FIGS. 24 and 25 are a graph and an outer appearance view of a Hall-element relating to the invention, respectively.

FIG. 24 is a graph exhibiting the characteristics of this VH-B, and this proves that the linage is excellent and a highly accurate detection is possible When a Hall element 132 and a magnet 131 are arranged face to face and either one is moved, then magnetic flux density B is changed and accordingly a Hall voltage VH in the above formula is changed. The invention is to apply the effects of a Hall element to the detection of a liquid pressure.

Figure 25:
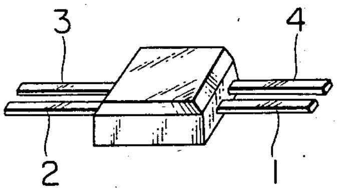

FIG. 25 shows an outer appearance of the abovementioned Hall element, wherein ①, ③ are connected to the side of input voltage Vc and ②, ④ to the side of Hall voltage VH that serves as an output, respectively.

Figure 26:
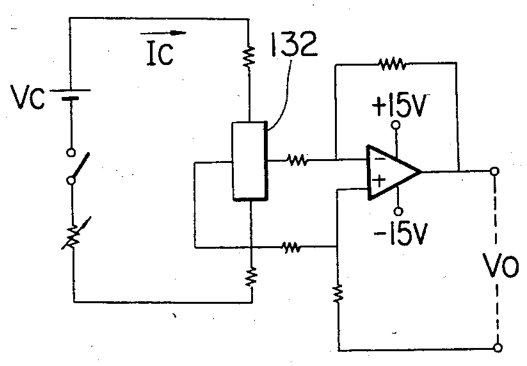
FIG. 26 is a driving circuit diagram of a Hall-element relating to the invention.

FIG. 26 illustrates an example of driving circuits being provided with Hall element 132 having the abovementioned characteristics. Wherein, the output signals of Hall element 132 are impedance-transformed in a driving circuit to be binary valued by a value corresponding to a prescribed liquid pressure of an ink chamber to be measured, and are then amplified and applied to a piezoelectric conversion element of valve means 25 of a recording head. The valve of the valve means 25 is opened when the liquid pressure detector 80A of flexible diaphragm 80 is relatively low in position and the liquid pressure is lower than a specific pressure, and the valve is closed when the detector 80A is relatively higher and the liquid pressure is higher than the specific pressure. When a liquid pressure is detected by Hall element 132 and the pressure detected is over the upper limit or below the lower limit of the specific pressure range, the valve means 25 is driven ON or OFF, and the amount of ink supplied from ink reservoir 27 is regulated by opening and closing the valve to maintain the liquid pressure of common ink chamber 23 constantly within the range between the upper and the lower limits of the specific pressure.

In the abovegiven example, a magnetic material 131 such as a magnet is fixed to the tip of the movable arm 83, however, it may also be allowed to fix the aforementioned Hall element 32 to the movable arm 83 and to arrange the magnet 131 to the fixed side, because the Hall element is small and light. Besides the above, there may be considered various kinds of means for relatively moving magnet 131 and Hall element 132. As for the magnetic materials, there may be allowed to use a magnetic thin film, a magnetic rubber or other metallic magnetic substances as well as a permanent magnet.

Figure 27:
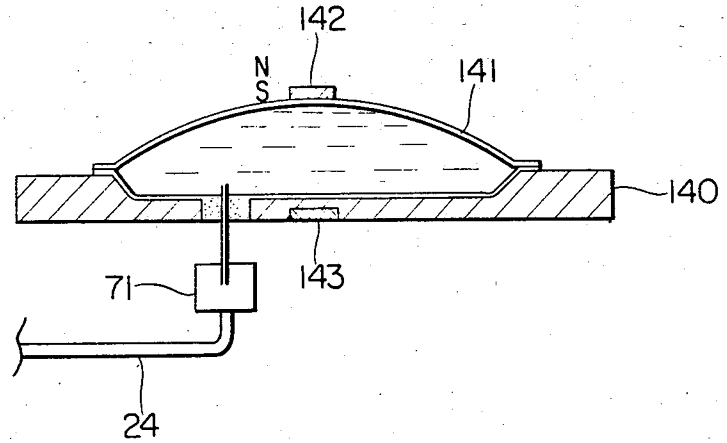
FIG. 27 is a sectional view illustrating an example of the ink residual amount detecting means of the invention.

FIG. 27 shows an example in which a magnetic flux variation detecting means of the invention is used for detecting the ink residual amount in an ink cartridge. Wherein, a part of an ink container bag containing ink in a sealed state forms a flexible diaphragm 141, and the outside of the bag is in a hydrostatic pressure or a pressurized state.

Ink stored in the ink container bag is replenished and supplied to a recording head (not shown), according to the ink consumption in the recording head, through a detachable ink connector 71 and by way of an ink supply tube 24. The position of the flexible diaphragm 141 forming a part of the ink container bag is relatively high in the initial stage where ink is filled up therein, however the position thereof gradually descends as ink reflows out and lastly reaches down to the final position where ink cannot be supplied at the specific pressure. At this time, the ink residual amount detecting means serves as a means for detecting the liquid level of this time, i.e., the final position of the flexible diaphragm.

To be more concrete, a small-sized permanent magnet 142 is attached to the central portion of the upper part of the flexible diaphragm 141 by making use of an epoxy adhesive, silicone rubber, adhesive tape or the like. On the other hand, a Hall element 143 is fixed to the bottom surface of a cartridge case 140 and is also arranged so as to face the magnet 142. According to such a constitution as mentioned above, when the ink residual amount in the ink container bag is reduced down to reach the aforementioned specific final position, the distance between magnet 142 and Hall element 143 becomes the shortest, and the output voltage VH of the Hall element 143 of this moment is detected to drive the external operations such as a warning, a signal for demanding stoppage in printing motion. Thereby, a low-cost and reliable ink residual amount detecting mechanism can be constructed.

Figure 28:
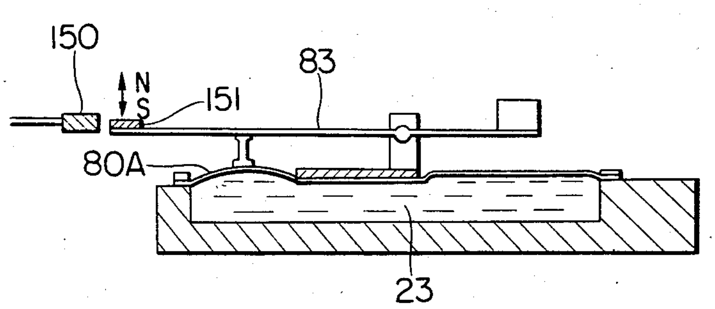
FIG. 28 is a sectional view illustrating another example of the liquid pressure detecting means of the recording heads of the invention.

FIG. 28 is a sectional view of a recording head attached with another example of ink residual amount detecting means of the invention. Wherein, a magnetoresisting element 150 is arranged onto a normal line position of a movable arm 83, in place of the Hall element 132 shown in FIG. 22. The position of liquid pressure detecting means 80A of flexible diaphragm 80 is detected by the correlative movements of the above-mentioned magnetoresisting element 150 and a magnet 151 fixed to the tip of the arm 83. The magnetoresisting elements 150 are to generate the output of the ampere value varied by a magnetic resistance effect to detect the position, and are popularly called an MR element. For example, an SDME (mfg. by Sony) and the like are being marketed.

As described above, besides the example given above, there may be considered various kinds of means for detecting an ink pressure or an ink residual amount by making use of a magnetic flux density detecting system using a Hall element or the like, or by making use of a magnetoresistance detecting system using an MR element or the like, and by sensing the displacements of a flexible diaphragm provided to one of a recording head, ink cartridge and ink-supply system so as to be deformed by bringing it into contact with ink. These are characterized in that no pressure is required for the measurements, the sensitivity and the detection accuracy are high, the temperature characteristics and the stability are excellent, and the practical reliability and the price range are reasonable.

Figure 29:
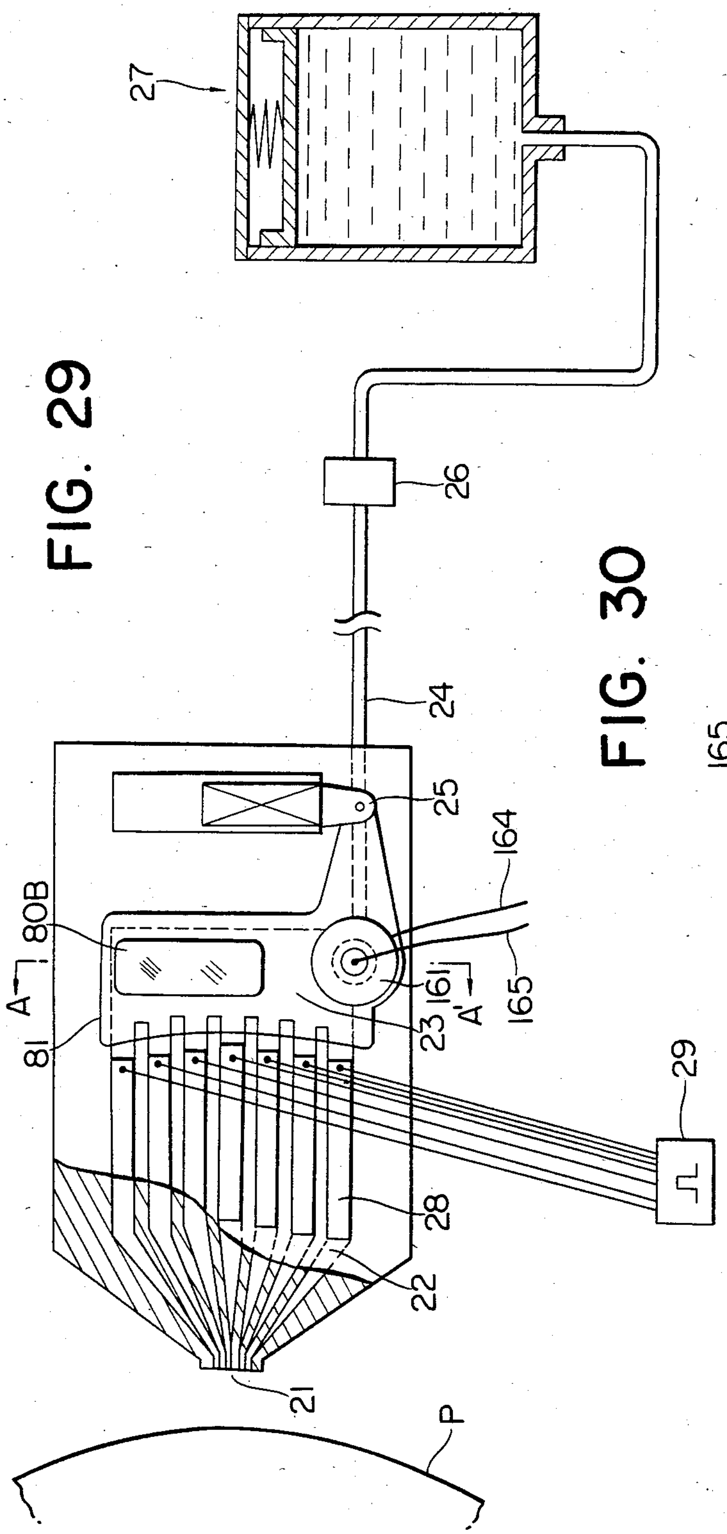
FIG. 29 is a typical sectional view of an ink-jet recording apparatus of the invention in which an electrostatic capacity detecting means is used.

FIG. 29 is a side sectional view showing a still further example of an ink-supply system and a recording head with a built-in liquid pressure detecting means of the invention.

Figure 30:
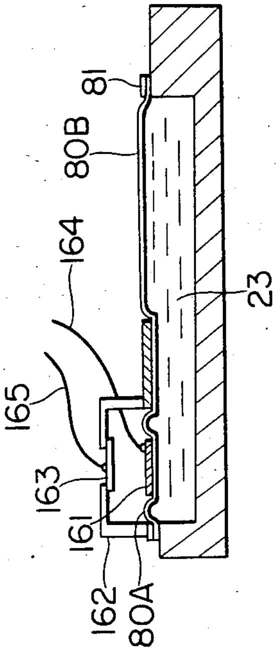
FIG. 30 is a sectional view showing a liquid pressure detecting means of a recording head of the invention.

FIG. 30 is a sectional view taken on line A–A' in FIG. 29.

In FIGS. 29, 30, like or corresponding parts to those shown in FIG. 11 are designated by like reference numerals or characters.

A movable detecting electrode 161 is adhered so as to be incorporated into a body to the central portion of the liquid pressure detecting means 80A that is made a part of a flexible diaphragm 80 disposed onto a common ink chamber 23 constructed as shown in FIGS. 29, 30. On the other hand, another piece of a fixed electrode 163 is fixed to a supporting frame 162 disposed onto the recording head so as to be arranged face to face to the electrode 161. Electrodes 161, 163 each are connected to the respective lead wires 164, 165 to conduct an external electric circuit.

In general, when a voltage is applied to a pair of electrodes which are arranged face to face, the electrodes are charged.

When a volatage is V, a charge to be stored is Q, an electrostatic capacity C to be generated between the electrodes is formularized below:

$$C=Q/V$$

On the other hand, the electrostatic capacity C is formularized below:

$$C=\epsilon S/d$$

Wherein, $\epsilon$ is a permittivity between two pieces of electrodes, d is a distance between the electrodes, and S is an area of the electrode.

Now, as shown in FIG. 30, a movable electrode 161 is disposed onto flexible diaphragm 80A and a fixed electrode 163 onto supporting frame 162 to be applied with a fixed voltage, and thus the movable electrode 161 on the flexible diaphragm 80A is moved according to the ink pressure variations of common ink chamber 23 so as to change the distance d between the electrodes, therefore, the liquid pressure can be measured by measuring the electrostatic capacity C.

In addition to the above, it is essential that among the outer circumference of liquid pressure detection section 80A of flexible diaphragm 80, the outer circumference remaining not provided with the movable electrode 161 should be sensibly deformed in response to the variations of liquid pressure. Therefore, if the width of such a deformation is too narrow, or if the flexible diaphragm is too hard or too stiff, a sensitivity for detecting a liquid pressure is lowered and further a hysteresis is caused in the corresponding relation between a liquid pressure and an electrostatic capacity to lower the detection accuracy, that is not desirable.

Figure 31:
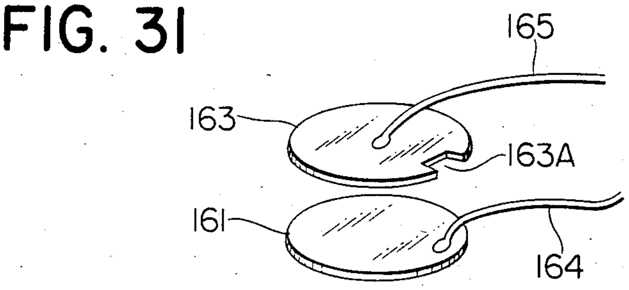
FIGS. 31 through 33 respectively show various configurations of the electrodes for liquid pressure detection of the invention.
Figure 32:
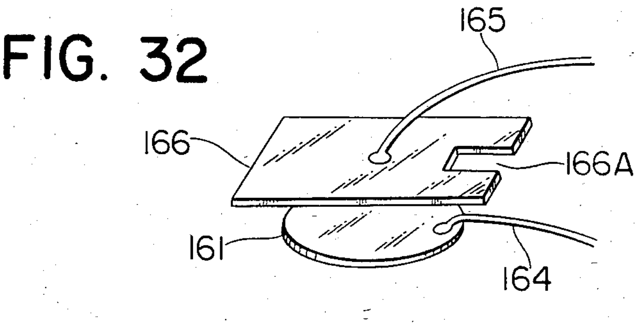
Figure 33:
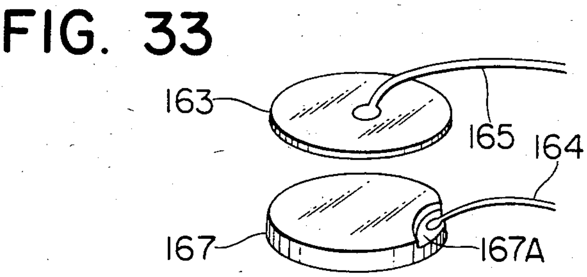

Next, the configurations of the electrodes 161, 162 which are arranged face to face are shown in FIGS. 31 through 33, respectively.

FIG. 31 shows two pieces of electrodes 161, 163 which are in the same dimensions and are arranged vertically face to face. Lead wire 164 connected fixedly to movable electrode 161 with a wire-bonding, a solder or a conductive paint so as to be arranged in a position where flexible diaphragm 80 may be freely operated. There is provided a notch 163A to such a place of fixed electrode 163 where the lead wire 164 and a contact point may not be damaged even when the movable electrode 161 moves in close to or is pressed by the fixed electrode 163.

FIG. 32 shows two pieces of electrodes each having the different configurations, that is an example in which the upper fixed electrode 166 is not disturbed by flexible diaphragm 80, therefore it is made larger in size arbitrarily or according to the circumstances than movable electrode 161, and 166A is a notch provided with the same purpose as mentioned above.

FIG. 33 shows an example of a lower movable electrode which is modified, wherein a level drop 167A is provided, in place of the abovementioned notch 163A or 166A, to a part of movable electrode 167 whereto a lead wire 164 is connected.

Figure 34:
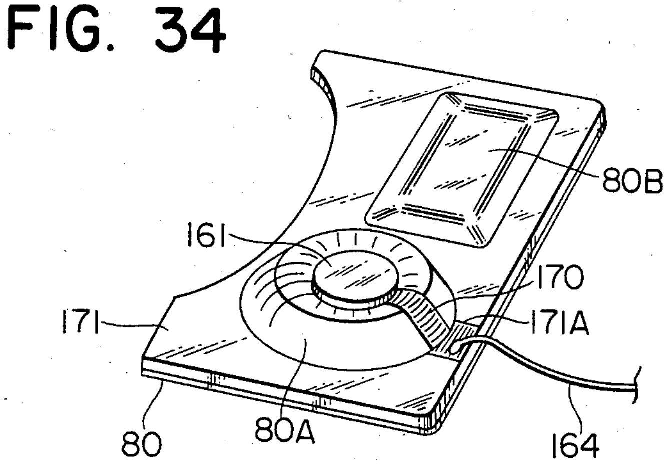
FIG. 34 is a perspective view showing another example of the liquid pressure detecting sections of the flexible diaphragms of the invention.

FIG. 34 is a perspective view showing another example of liquid pressure detection section 80A of flexible diaphragm 80, wherein a conductive pattern 170 is formed on flexible diaphragm 80 by an evaporation or by a spattering, and movable electrode 161 is fixed to the center of liquid pressure detection section 80A with a conductive adhesive. On the other hand, a part of regulator frame 171 for fixing flexible diaphragm 80 to a recording head base is made conductive and to which a lead wire 164 is connected. By constructing as mentioned above, such advantages may be claimed not only that a lead wire may easily be connected but also that any notch is not required to provide to the upper fixed electrode 163.

Further, the abovementioned lead wires 164, 165 should be flexible so as not to disturb the movement of liquid pressure detection section 80A of flexible diaphragm 80, in order to sensibly detect the movement thereof. As for the suitable lead wires, such a metal fine line as a gold line or an aluminium line of 50 μm in diameter may be given as the example thereof.

Pressure waves propagated from a plurality of pressure chambers 22 are absorbed by the deformation of piezoelectric conversion element 28 at the time of recording. It would therefore be better to provide flexible diaphragm 80 tightly sealing the opening on the upper part of common ink chamber 23 extending all over the width of the influx of all pressure chambers so as to serve as regulator 80B for absorbing the pressure waves. However, it can't help reducing the area of the regulator 80B because the abovementioned liquid pressure detecting section 80A is to be provided. Nevertheless, if the liquid pressure detection section 80A is arranged to such a position where is a part of common ink chamber 23 and is also close to the pressure chamber 22, the 80A may be able to double the parts of itself and a pressure wave absorber.

Further, for an external noise protection, it is desired to cover the circumference of the electrodes 161, 163 and the lead wire both for detecting liquid pressure with a piece of grounded shield plate.

Figure 35:
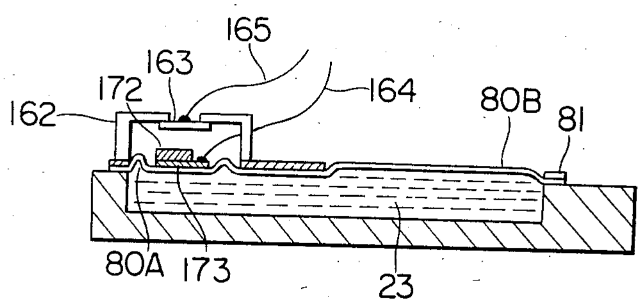
FIGS. 35 and 36 show the other example of the liquid pressure detecting means of the invention, respectively.
Figure 36:
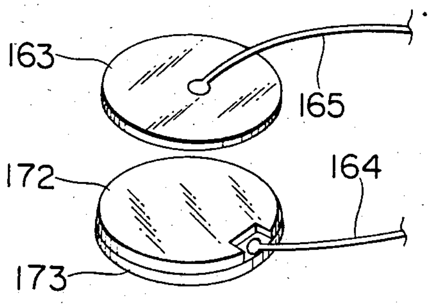

Next, FIGS. 35, 36 are further examples of the liquid pressure detecting means of the invention, respectively. FIG. 35 is a sectional view of a common ink chamber of a recording head, and FIG. 36 is a perspective view of a pair of electrodes. Wherein, such a conductive diaphragm 172 as shown in the drawings is attached or adhered to either upper fixed electrode 63 or lower movable electrode 173. The thickness of the conductive diaphragm 172 is desired to be thicker than that of the connector of lead wire 164. When constructed as mentioned above, the insulation between the electrodes 163, 173 may be maintained even if liquid pressure detection section 80A of flexible diaphragm 80 is expanded to ascend movable electrode 173 and thus the electrodes 163, 173 come into contact with each other, because the conductive diaphragm 172 is interposed therebetween. Accordingly, even when a pair of electrodes are arranged very close to each other in the state where a liquid pressure is held for a normal recording operation, it is possible by interposing the conductive diaphragm 172 to prevent the damage of electrodes or circuits caused by the liquid pressure detection section 80A of flexible diaphragm 80 approaching and pressing thereto when the liquid pressure detection section 80A is expanded by a pressure rise given by something like a purge, i.e., if a bubble or a solid matter is mixed with ink in a nozzle 21, that is, if a so-called clog is caused, such a bubble or solid matter is discharged from the nozzle 21 by pressurizing ink to send from ink reservoir 27 into the ink flow channels of a recording head, or such a clog is prevented before a bubble or solid matter is produced by periodically pressurizing ink to send thereto in advance. Meanwhile, the both electrodes may be closely arranged because the abovementioned conductive diaphragm 172 is arranged so as not to produce any short circuit, therefore, an electrostatic capacity C and a liquid pressure detection sensitivity may be increased.

Figure 37:
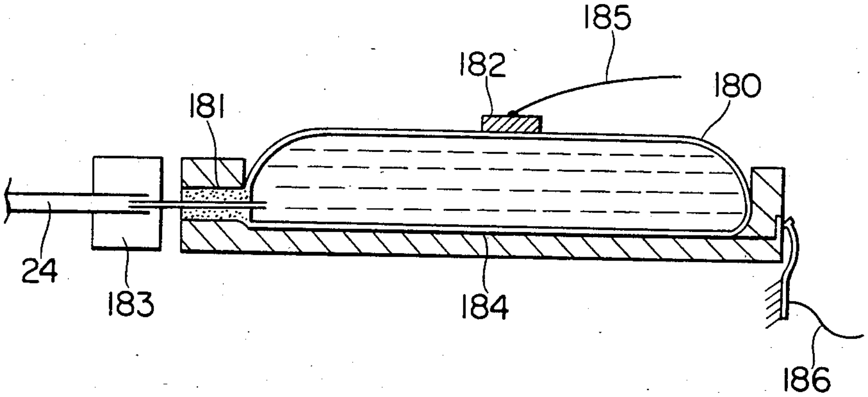
FIG. 37 is a sectional view showing an ink residual amount detecting means of an ink cartridge of the invention.

FIG. 37 is a sectional view showing an example in which a liquid pressure detection means of the invention is arranged to an ink cartridge to detect an ink remaining amount of the cartridge. In this drawing, a flexible diaphragm 180 is provided to at least a part of an ink container bag containing recording ink and to the nearly center of the flexible diaphragm 180 a movable electrode 182 for detecting liquid pressure is fixed with an adhesive or the like. On the other hand, a conductor 184 is formed in at least a part of the ink cartridge body to which the movable electrode 182 is faced, so that an electrostatic capacity may be generated between the movable electrode 182 and the conductor 184 of the cartridge body. Lead wires 185, 186 are connected respectively to the electrodes 182, 184 to conduct an external driving circuit. One end of the ink cartridge is served as an elastic septum 181 and is connected to ink connector 183, and then ink is supplied from the ink container bag to a recording head through the ink connector 183 and ink supply tube 24. In such an ink cartridge constructed as mentioned above, when the flexible diaphragm 180 is getting lowered as ink is gradually consumed, the movable electrode 182 discends at the same time to approach the conductor 184 being situated in the lower body and then to increase an electrostatic capacity. And, an electrostatic capacity value at the time of an insufficient ink remaining level is made as the reference value, and when an electrostatic capacity exceeds the reference value, a warning is sent or a recording is suspended. It is thereby possible to attain a reliable and low cost ink remaining amount detection mechanism. Further, in this example, ink should be dielectric. Should the ink be conductive, the electrostatic capacity thereof becomes constant regardless of the height of flexible diaphragm 80.

Figure 38:
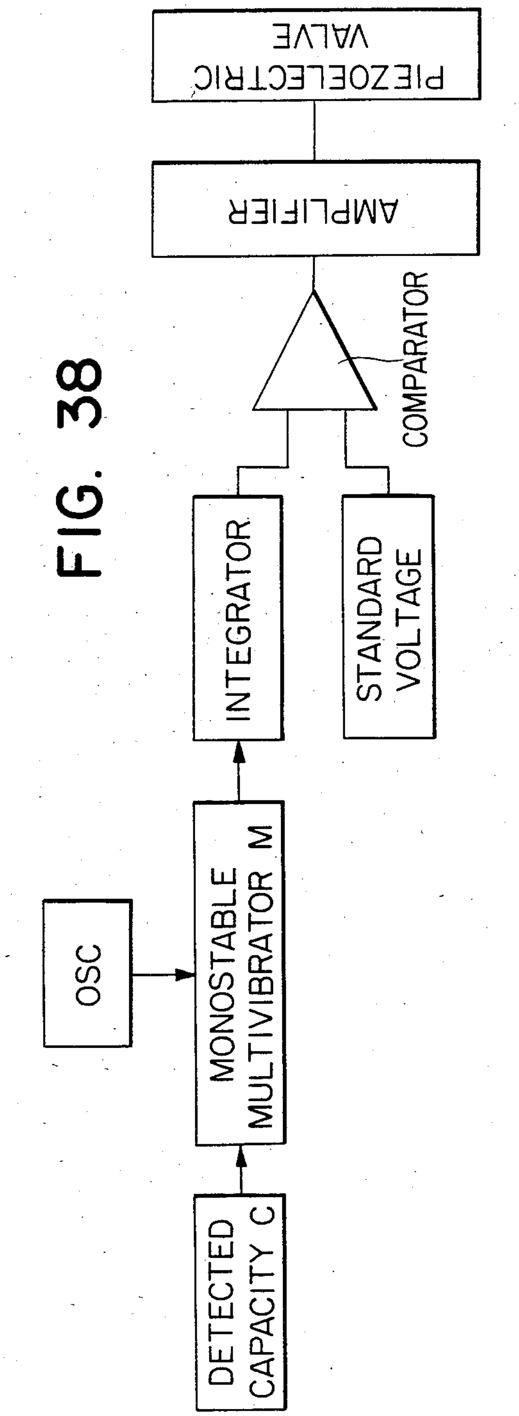
FIGS. 38 and 39 each are the schematic circuit construction diagrams respectively illustrating the operation of the liquid pressure detecting means of the invention.

FIG. 38 is a circuit diaphragm showing the operation of a liquid pressure detection control of the invention. Wherein, an oscillator OSC is a device for continuously generating vibrations of constant waveforms, frequencies and amplitudes, and it is connected to a monostable multivibrator M (hereinafter call a monomulti). This monomulti M is a circuit which is inverted by an external pulse as s starter for only a period determined by its own circuit constant and is then restored into the original state. This monomulti M generates constant pulse in a wide range of ns to several tens seconds with an external resistance and electrostatic capacity. For the liquid pressure detecting purpose in the invention, an SN 74123 Model monomulti made by Texas Instrument Co., for example, is ready and suitable for controlling an output.

As the external electrostatic capacity for determining a range of pulse generated by the abovementioned monomulti M, there connects a detecting electrode C for detecting a liquid pressure comprising the described movable electrode 161 (or 167, 182) and the fixed electrode 163 (or 166, 184). Thus, a pulse train generated from the monomulti M is modulated in pulse duration according to the liquid pressure. The pulse train of which the pulse duration was modulated is smoothed by an integrator. Thereby, a voltage signal corresponding to a liquid pressure is thus obtained. A voltage signal corresponding to a liquid pressure generated from the integrator and the reference voltage signal corresponding to the specified liquid pressure are compared each other by a comparator. The output therefrom is amplified and is then applied to the piezoelectric valve of a valve means 25.

In this instance, if the height of the liquid pressure detecting means 80A of flexible diaphragm 80 is relatively low and the liquid pressure is relatively lower than the specified pressure level, the valve of the valve means 25 is operated to open by the piezoelectric valve, and if the height of the liquid pressure detecting means 80A is high and the liquid pressure is higher than the specified pressure level, the valve is operated to close.

Figure 39:
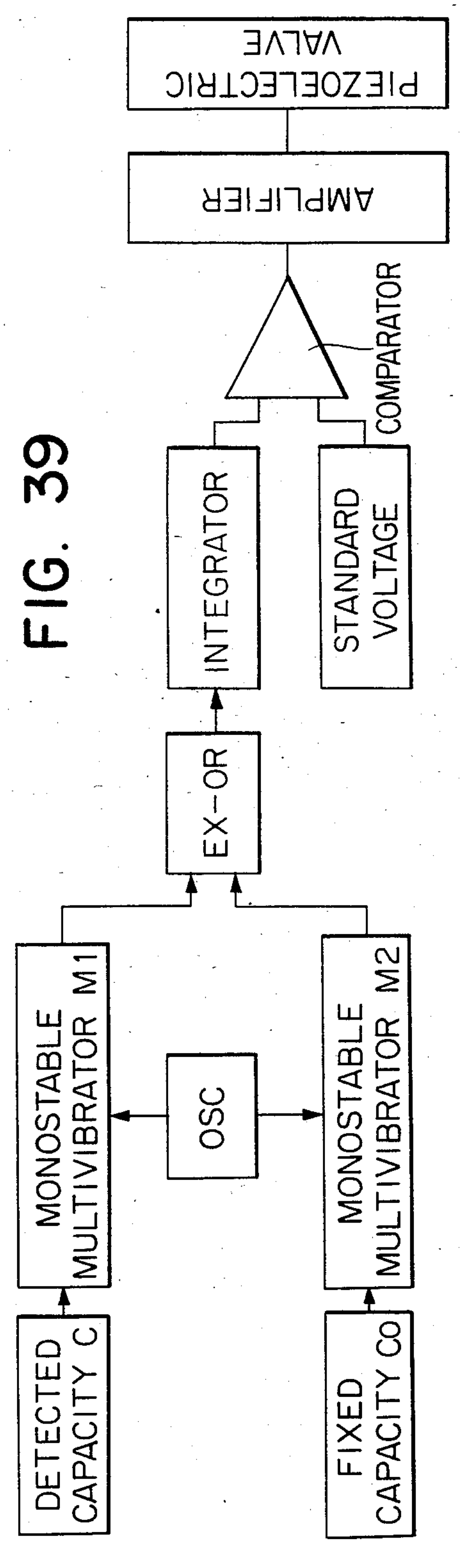
Figure 40A:
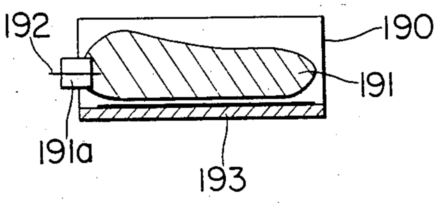
FIG. 40(*a*)-(*d'*) are a schematic illustration of a further embodiment of the invention.
Figure 40A:
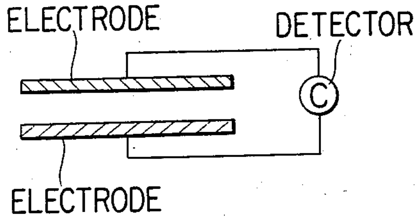
Figure 40B:
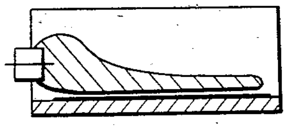
Figure 40B:
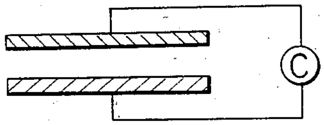
Figure 40C:
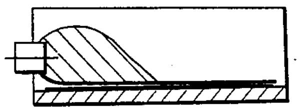
Figure 40C:
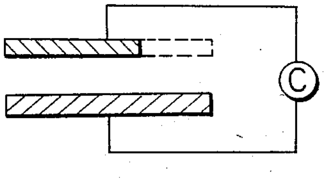
Figure 40D:
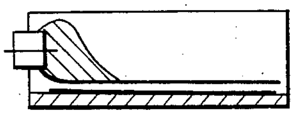
Figure 40D:
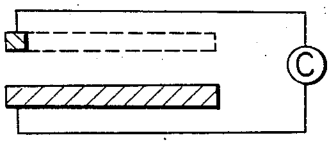

FIG. 39 is a circuit arrangement diagram illustrating how to operate a liquid pressure detecting control of the invention in a further example, that is thereby characterized in improving the detection accuracy of an electrostatic capacity.

According to this diagram, another system of circuit around the monomulti M is further added. In the second system of circuit, the pulse duration of monomulti M2 is determined by the reference capacitor Co having a fixed capacity. The electrostatic capacity of this Co is so determined as to be slightly lower than either specified liquid pressure to be controlled or a specified pressure value corresponding to a point of time of warning for an ink remaining detection or a point of time of stopping a recording operation. A liquid pressure detecting electrode C of a variable capacity and a reference capacitor Co of a fixed capacity are connected respectively to monomulti M1 and M2, and these systems are driven by a clock generated by one and the same oscillator OSC. The electrodes C, Co are desirably selected so that the temperature coefficients of both electrodes and the like may be agreed.

Next, the output pulses generated from both of the monomulti M1 and M2 are inputted to an excusive-OR circuit EX-OR and are then further inputted to the integrator. According to such a binary system arrangement as mentioned above, the duration of pulses inputted to the integrator corresponds to a liquid pressre change and the rate of change of the duration becomes high. The circuit arrangements after the integrator are same as shown in FIG. 13. According to such a arrangement as mentioned above, it is possible to attain a highly stabilized and sensitive circuit for detecting a liquid pressure and an ink remaining amount.

FIG. 40 shows a still further example of the invention, wherein an ink remaining amount of an ink cartridge is detected, when conductive ink is used, by utilizing the conductivity of the ink. Similar to the ink cartridge shown in FIG. 37, that of this example is used in an ink jet recording apparatus.

Numeral 190 is an ink cartridge body and an ink container bag 191 for containing ink is stored therein. 192 is a needle which passes through a container cap 1912 of which the main part is made of rubber. This needle is a hollow needle having an ink flow hole from which ink is fed into a recording head through an ink feed tube. 193 is an electrode provided to the bottom of the cartridge body. The needle 192 is made of a metal and is formed as the opposite electrode to the electrode 193. Both of the electrodes 192, 193 are connected to an electrostatic capacity detector, as shown in FIG. 40(*a'*).

When ink is filled up in ink container bag 191, the ink is spread all over the area of electrode 193, therefore the ink functions is an electrode so as to be equivalent to the electrodes as shown in FIG. 40(*a'*). Even when the ink amount is reduced a little by consumption, the ink still covers nearly all over the electrode 193 as shown in FIG. 40(*b*), the electrodes can function on an equality with those when ink is filled, as shown in FIG. 40(*b'*).

In the meantime, when ink of the ink container bag is reduced further to be in such a state as shown in FIGS. 40(*c*), 40(*d*), ink covers only a part of electrode 193 and the upper electrode can function only as a substantially small electrode, as shown in FIGS. 40(*c'*) and 40(*d'*).

The changes in the electrode structure described above may be detected by an electrostatic capacity detector.

As described above, by means of a non-contact type position detecting means using a liquid pressure detecting means of the invention which detects a pressure according to an electrostatic capacity, and based upon the displacements of a flexible diaphragm which is deformed by coming into contact with ink and is disposed to one of a recording head, ink cartridge and ink supply system, an ink pressure and an ink remaining amount may be detected to control. In particular, this means is high in sensitivity, detection accuracy and stability, excellent in temperature characteristics, and suitable for practical reliability and cost performance.

As described above, in the invention, there are provided to a detecting position with a flexible diaphragm which is deformed according to an ink pressure or an ink remaining amount, and with one of a vibrating element, photodetector, magnetically sensitive element and electrostatic detector as a detecting means for detecting a displacement of the flexible diaphragm in the vicinity of the flexible diaphragm, and out of the detecting means two pieces of the same kind or the different kinds thereof may be allowed to provide. For example, two pieces of flexible diaphragms and the corresponding detection means thereto are provided to one or two pieces out of common ink chamber 23 of a recording head, a part of ink flow passage and ink cartridge. One of the detecting means it to send a warning that an ink remaining amount is nearly in short supply, and at the point of time of the shortage, the ink cartridge is replaced and ink is replenished. With the other detecting means, a recording apparatus is suspended for emergency in action when this detecting means detects in advance such a state where ink is not replenished in spite of the warning and the ink is still further reduced to be no longer able to perform any regular recording operation. Thus, this invention is characterized in that every constant and stable recording can be performed by the two pieces of detecting means.

Figure 42:
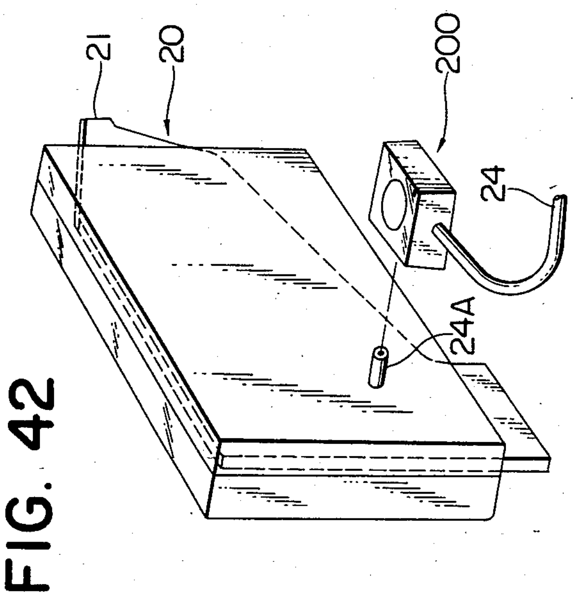
FIGS. 41 and 42 are a sectional view and a perspective view respectively showing an example in which a liquid pressure detecting means of the invention is disposed between a recording head and an ink reservoir.
Figure 41:
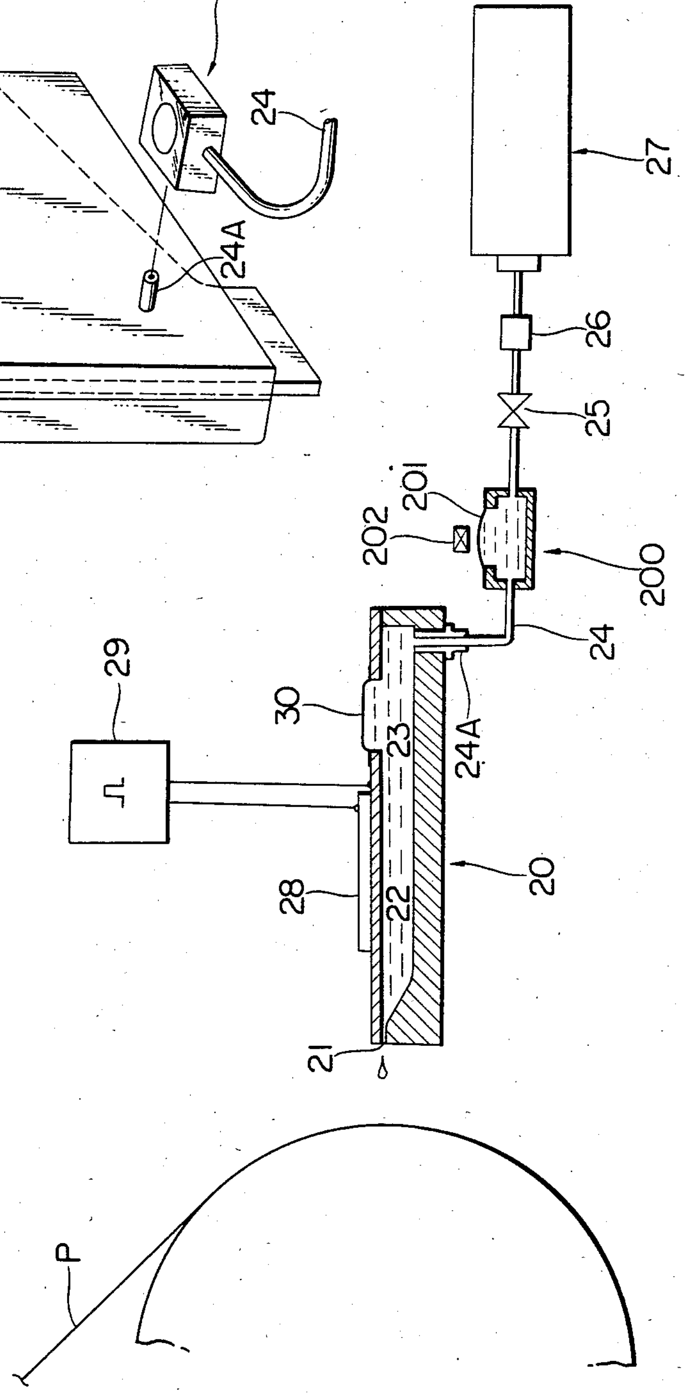

Next, referring to further examples of the positions whereto the flexible diaphragm and the detecting means each are provided;

FIG. 41 shows an example in which an ink pressure detecting means 200 comprising a flexible diaphragm 201 and a detecting means 202 is arranged in the middle of an ink supply passage for supplying ink from ink reservoir 27 to recording head 20. For example, the liquid pressure detecting means 200 is fixed to either carriage loading the recording head 20 or the inside of a recording apparatus. Or, as shown in FIG. 42, it is also allowed to construct so as to directly connect a liquid pressure detecting means 200 to an ink introducing connector 24A of the recording head 20. FIG. 42 is a perspective view showing a state where the detecting means 200 is not yet connected to 24A.

Figure 43:
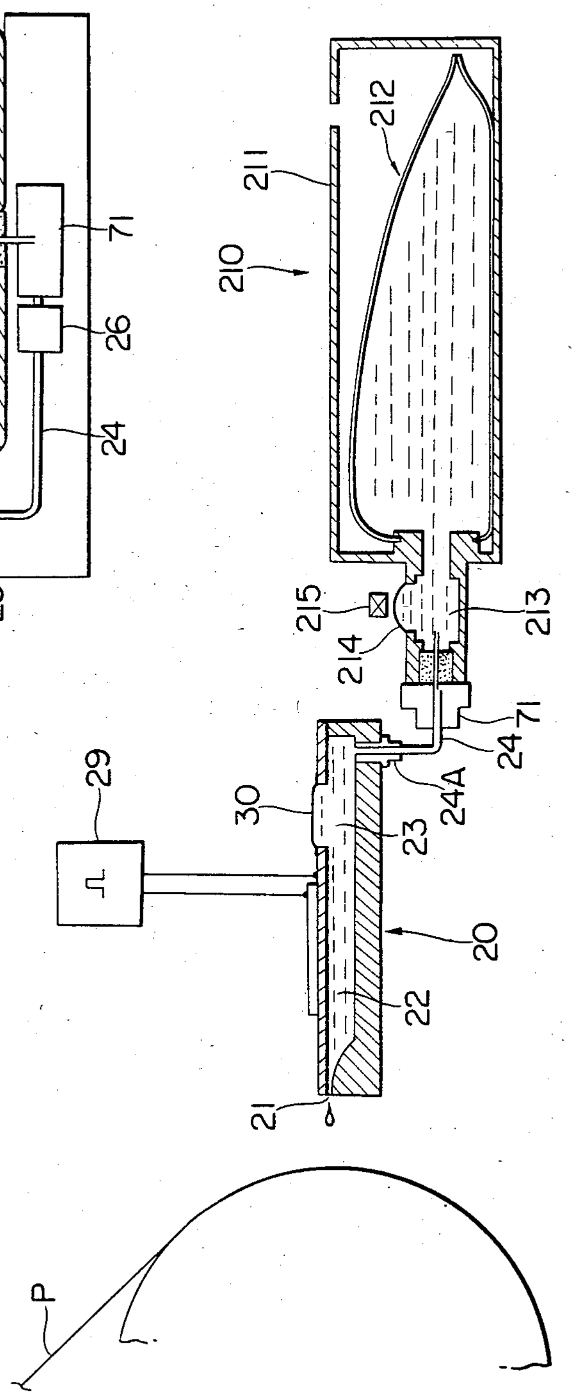

FIG. 43 illustrates a liquid pressure detecting means characterized in that a means for detecting ink pressure of recording head 20 is provided to a part of an ink cartridge 210. The position of this liquid pressure detecting means may be allowed to be in the vicinity of the exterior of the ink cartridge 210 to which an ink connector 71 is connected, or to be inside the body 21 of the ink cartridge 20. FIG. 43 shows an example in which the liquid pressure detecting means is provided to the exterior of ink cartridge 210. In this drawing, 214 is a flexible diaphragm attached in liquid tightness to the surface of the opening of ink-chamber 213; 215 is a displacement detector provided to the upper part of the flexible diaphragm 214 so as to measure a displacement caused by the deformation of the flexible diaphragm 214 in such a state that this detector 215 comes into light contact or no contact with the flexible diaphragm 214.

Figure 44:
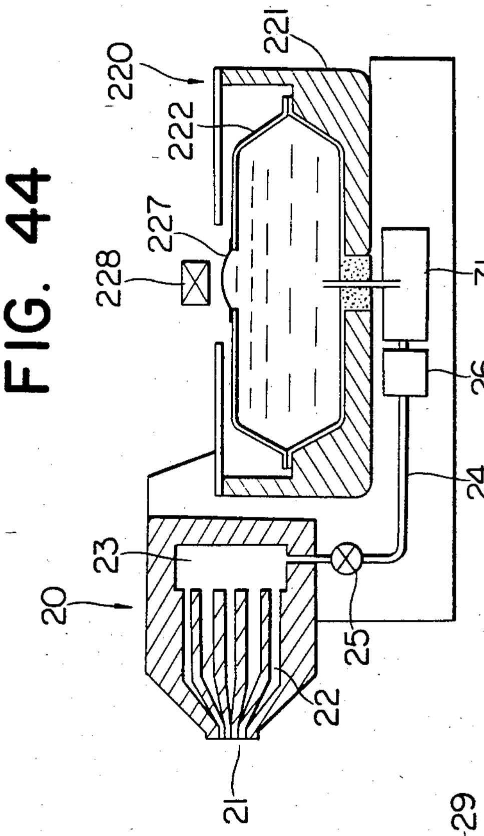
FIGS. 43 through 45 are the sectional views respectively showing an example in which a liquid pressure detecting means of the invention is attached to an ink cartridge.

FIG. 44 is a sectional view of another example showing an ink flow passage having a liquid pressure detecting means of the invention. Wherein, a cartridge body 221 forming an ink cartridge 220 has therein an ink container bag 222. Ink being contained in the ink container bag 222 communicates to a recording head 20 through an ink connector 71, filter 26 and ink-supply tube 24, respectively. The volume of the ink container bag 222 is correspondingly reduced according to the reduction of ink remaining amount. A displacement detector 228 provided to the upper part of the ink container bag 222 is lowered together with the ink container bag 222 and when the liquid pressure of the ink container bag 222 is lowered in excess of a fixed pressure, it detects the displacement of the flexible diaphragm 227 so as to operate for controlling a valve means 24, for sending a warning and for suspending a recording.

Figure 45:
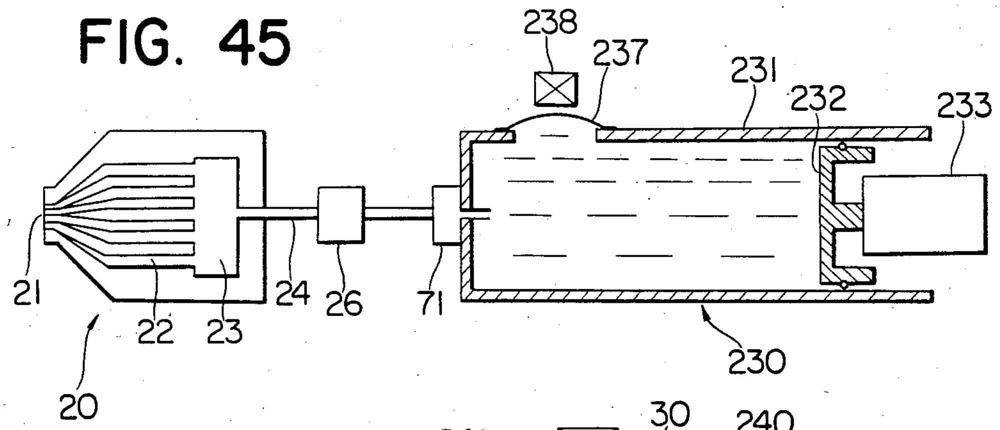
Figure 46:
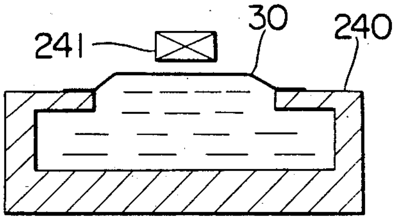
FIGS. 46 through 49 are the sectional views respectively showing various configurations of the flexible diaphragms relating to the invention.

FIG. 45 is a sectional view showing a further example of an ink storage having a liquid pressure detecting means unit of the invention. In this drawing, chamber body 231 for forming an ink tank 230 is provided to one end thereof with a piston 232 which is a pressurizing means, i.e., a liquid pressure regulating means and a driving power source 233 such as a motor solenoid or the like for driving the piston 232. On the other hand, onto the upper part of the chamber body 231, a displacement detector 238 is provided so as to detect the height of the flexible diaphragm 237 by coming into contact or no contact with the flexible diaphragm 237. When a liquid pressure of a recording head, that is, a liquid pressure of the chamber body is lowered in excess of a fixed pressure, the variation of this liquid pressure is detected as the displacement amount so as to keep the liquid pressure of the ink tank 230 constant or to adjust the liquid pressure to an arbitrary level as occasion calls, by driving the driving source 233 of the pressurizing means through a control circuit and a driving circuit to reciprocate the piston 232.

As various sectional views of flexible diaphragms are shown respectively in FIGS. 46 through 49, various types thereof such as 30, 50, 80, 201, 214, 217, 227 and 237 may be devised. FIGS. 46 through 49 illustrate the respective sectional views of the flexible diaphragms in the forms of a water pillow, a dome, a corrugation and a small corrugation arranged to the circumference of the flexible diaphragm. As for the plane views of the flexible diaphragms having the above given sectional views may be configurated in a rectangular, circular, elliptical or other form according to the construction of recording heads.

The flexible diaphragm 30 each in the abovementioned forms are formed so as to displace in response sensibly to an ink pressure of the recording head and are attached in liquid tightness to the surface of a frame body 240, e.g., an ink chamber 23, an ink flow passage 24 or an ink tank 27 of a recording head.

As for the materials of flexible diaphragms 30, there may be used such a plastic material as vinyliden chloride, polyethylene, Nylon, polypropylene and the like which is made in the form of a single thin diaphragm or a laminated layer. Such a metal thin laminated layer such as those of aluminium treated or an evaporation deposited one may also be used. In addition to the above, taking into consideration of a heat-deformation caused when a flexible diaphragm 30 is attached to a frame body 240 and is then thermally set, it is also effective to a apply a heat-treatment in advance to the flexible diaphragm 30. As for the metal materials for the flexible diaphragms, various kinds of thin plates made of aluminium, stainless steel, brass or the like may be used, however such a metal changeable in the composition when coming into contact with ink or producible a harmful influence upon ink are not to be used.

Figure 50:
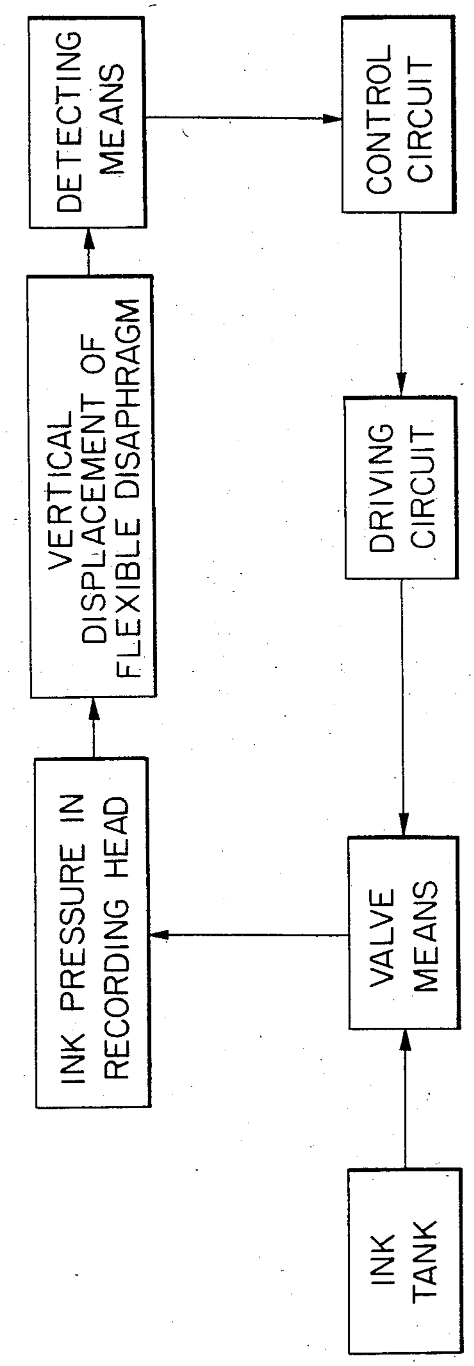
FIGS. 50 and 54 are the block diagrams respectively showing a liquid pressure detection control process.

Ink pressure is controlled by utilizing such a flexible diaphragm as mentioned above and by constituting as shown by a block diagram in FIG. 50. The height of the flexible diaphragm 30 is changed corresponding to the changes of liquid pressure of a recording head. By the change in height of the flexible diaphragm 30, the space between a non contact type position detecting means 241 fixed to the upper part of the recording head and the flexible diaphragm 30 is measured to detect and the resulting output signal is inputted to a control circuit. The control circuit processes the inputted signal so as to output a control signal to a circuit for driving a valve means 25. Upon the receipt of the signal given from the valve means driving circuit, the valve means 25 is started to operate to pour ink fed from ink tank 27 into the recording head. As printing are in progress, an ink amount of the recording head is reduced, and when a liquid pressure is lowered, the lowered position of the flexible diaphragm 30 is detected by the above-mentioned system to pour a suitable amount of ink from the ink tank 27 so that the ink amount or the ink pressure of the recording head may be maintained within the range between constant upper and lower limits and a stable ink-jet flying characteristics may be maintained.

Figure 51:
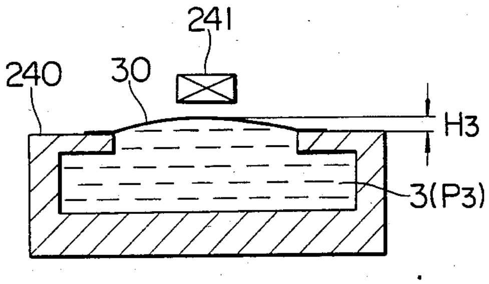
FIG. 51 A–C are a sectional view showing a series of processes of the deformation of a flexible diaphragm of the invention and the relative change of the liquid pressure.
Figure 51:
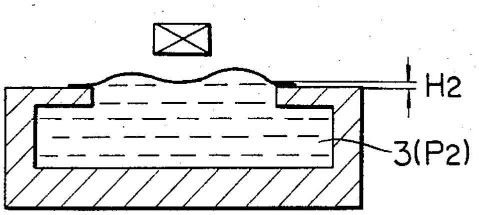
Figure 51:
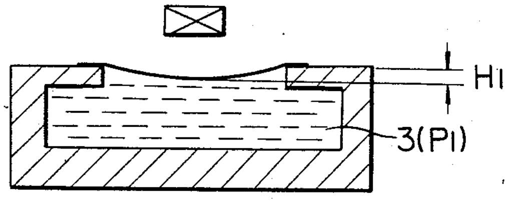

FIGS. 51 (A), (B), (C) respectively show the deformation processes of flexible diaphragm 30 and ink pressure lowerings caused in the abovementioned recording head 20. $H_1$, $H_2$, $H_3$ in each drawing indicate respectively a distance from the reference position on the upper surface of the frame body 240 to a specified detection position of the flexible diaphragm 30. The position in height of such a flexible diaphragm 30 may be detected by a non-contact type position detecting means 241 to measure the space between the detecting means 241 and the flexible diaphragm 30.

In FIG. 50, there are shown the processes in which a flexible diaphragm 30 is getting deformed as liquid pressure P is varied. Namely, when a liquid pressure is gradually reduced from a sufficiently high pressure $P_3$, for example, the central portion of the flexible diaphragm 30 is started to cave in at first, and as the pressure is reduced further to and around $P_2$, the dent is spread over to the circumference thereof, and when the pressure is sufficiently reduced to $P_1$, the whole body of the flexible diaphragm is finally dented.

Figure 52:
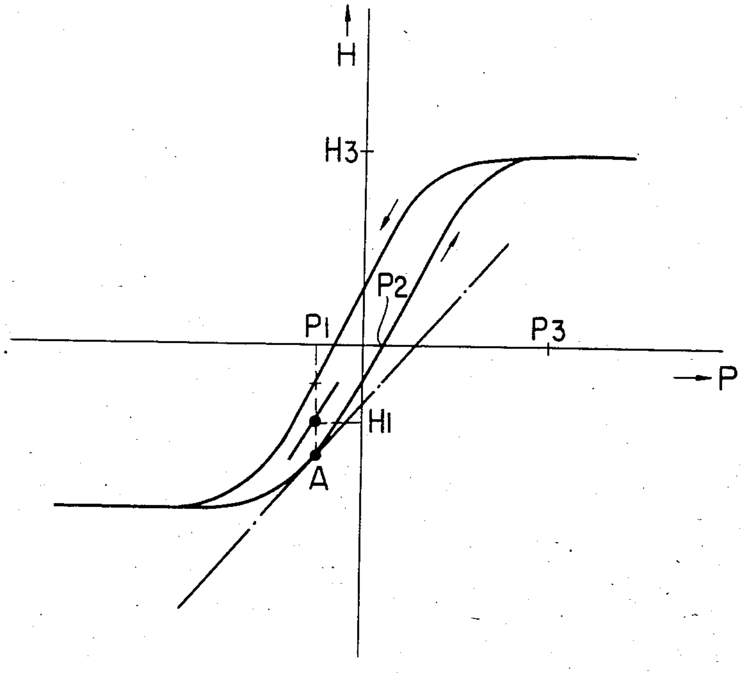
FIG. 52 shows the characteristic curves of the liquid pressure of a recording head and the displacements of a flexible diaphragm.

FIG. 52 is the characteristic curves showing respectively a change in height of flexible diaphragm 19 ($H_1 \sim H_3 \sim$) and a change in ink pressure of the abovementioned recording head ($P_1 \sim P_3 \sim$). These characteristics are shown in the respective hysteresis curves as shown in FIG. 52 because of the peculiar stiffness depending upon the materials, thickness and treatments of flexible diaphragm 30. When a tangent line is taken on an arbitrary point A on this curve, a tangent of this tangent line is given by dH/dP. For designing a flexible diaphragm, it is essential to determine a pressure sensitivity of a flexible diaphragm under a liquid pressure $P_1$ to be used for an ink-jet recording purpose. This pressure sensitivity means a ratio of a change in height of a flexible diaphragm to a change in a liquid pressure P. The higher a value of dH/dP is, the more an pressure detection may be accurate and the easier a pressure control is. On the contrary, if a value of dH/dP is small, a wide range of pressure detection can be done, however, the accuracy of a pressure measurement or a pressure control is lowered.

Figure 47:
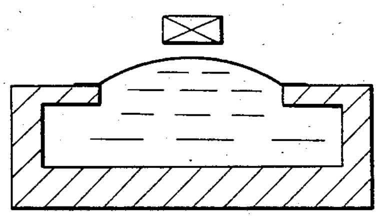
Figure 48:
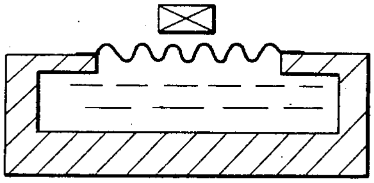
Figure 49:
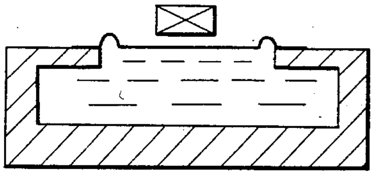

In the case of increasing the value of dH/dP, it would be better to provide a flexible diaphragm in the form of a plurality of concentric circles or scrolled corrugates, as shown in FIG. 48. A globular form as shown in FIG. 47 is better to adopt if a hysteresis must be made greater to some degree as the curves shown in FIG. 51.

In the case that an ink-jet recording is practically performed, excellent liquid drop jetting characteristics may be enjoyed when ink-pressure P is maintained around $P_1$ that is somewhat negative, e.g., $-5$ to $-10$ cm $H_2O$, and further if a dH/dP value should be made greater around the liguid pressure $P_1$, a hysteresis would be better to applied in some degree.

The inventors have tried and repeated the experiments and the trial manufactures within the range of dH/dP values from 5 $\mu$m/cm $H_2O$ to 20 mm/cm $H_2O$ and have finally attained to materialize the invention. In addition, the inventors have had confidence that the feasibility can be attained within the range from 0.1 $\mu$m/cm $H_2O$ up to 1000 mm/cm $H_2O$ by modifying the structure of a recording head and the configuration, size and material of a flexible diaphragm. The above-mentioned dH/dP values are those measured in the portion detected by detector 241 of a flexible diaphragm which is deformed by the change of a liquid pressure. With respect to a characteristic curve, these values are measured in a portion used for measuring a displacement on the characteristic curve. Such a portion is mostly the shapest gradient portion to be measured.

In designing a flexible diaphragm, the characteristic curve shown in FIG. 52 should have an excellent reproductivity. In addition, it is better to make a hysteresis smaller if possible in the abovementioned loop shaped characteristic curve. In a characteristic curve of a flexible diaphragm which is kept printing or warming up for a long time, the height $H_1$ of the flexible diaphragm to a liquid pressure $P_1$ becomes stable in the almost middle between the upper loop and the lower loop shown in FIG. 52.

A desirable dH/dP value may be obtained in the vicinity of a liquid pressure $P_1$ to be used for recording, by suitably selecting the sectional configurations of flexible diaphragms shown in FIGS. 46 through 49, i.e., the dimensions curvature and the like of a trapezoid, globularity, corrugation, circumferential corrugation and the like and the stiffness of the materials of the flexible diaphragm.

Figure 53:
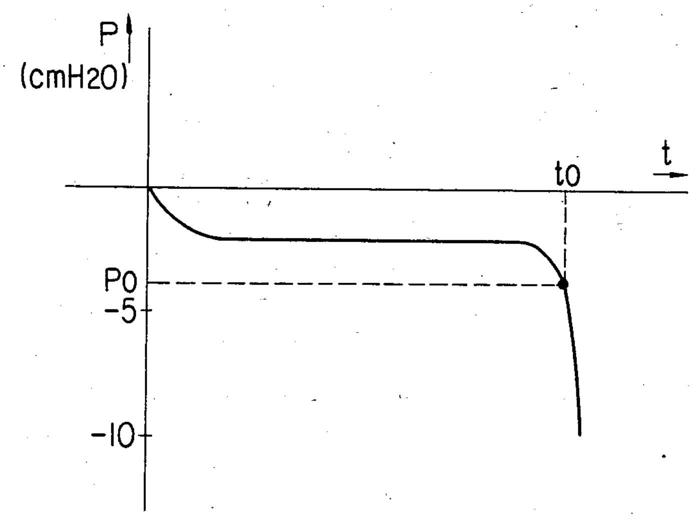
FIG. 53 shows the characteristic curve of liquid pressure of a hydrostatic pressure type ink-supply system.

When the liquid pressure detection capability of the invention attained by the displacement characteristcs of a flexible diaphragm is applied, an ink remaining amount in an ink tank of a hydrostatic type ink-supply system can also be detected. To be more concrete, when an ink remaining amount is reduced in an ink tank, the ink pressure of a recording head is then lowered. Therefore, the ink pressure of the recording head is monitored to send a warning and to stop a printing operation when the liquid pressure is lowered in excess of a specified pressure. For example, FIG. 53 shows a characteristic curve of liquid pressure changes on the side of a recording head. This curve expresses a series of ink pressure changes in the recording head in such a progress from a state where an ink tank is filled up to a state where the ink is consumed at a constant rate in printing operation. Wherein, an almost constant liquid pressure is maintained at the initial stage, however, when the ink remaining amount is reduced in excess of a certain degree, the liquid pressure is suddenly started to drop. At the point of time when the liquid pressure dropped down to Po, a warning is sent or a printing is suspended in operation. It may also be allowed to divide the functions into two, i.e., a warning is sent at Po1 and a printing suspension at Po2.

In the case of the application to an ink remaining amount detection, it is also allowable to constitute so that the height of a flexible diaphragm may be rapidly varied around the liquid pressure Po. For example, when a liquid pressure reaches around Po, the characteristic curve is suddenly varied from a sufficient convex into a sufficient concave. When arranging a characteristic curve like the above, a relatively inaccurate and low-cost liquid pressure detecting means may be used.

Figure 54:
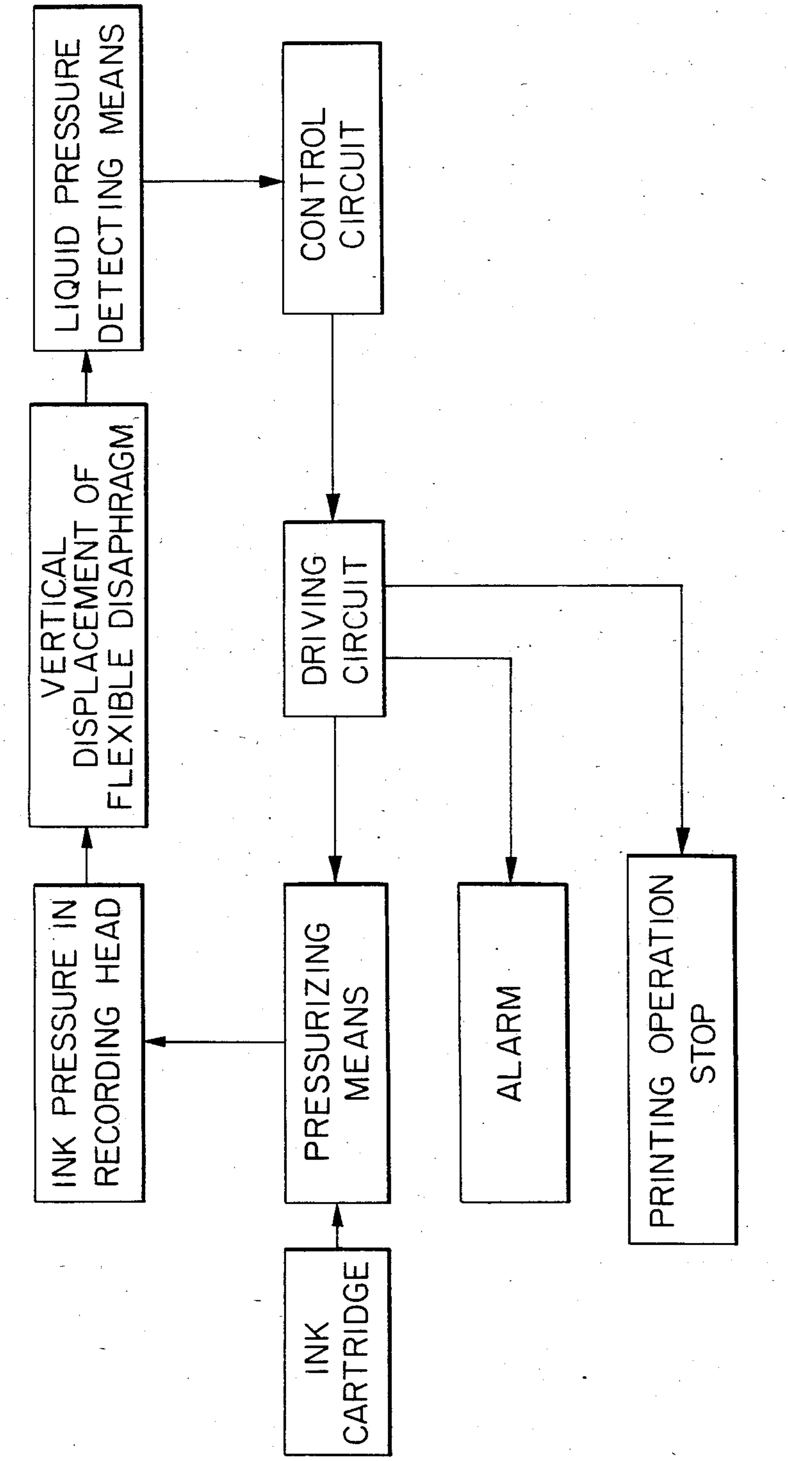

FIG. 54 is a block diagram showing an ink-jet recording apparatus having a pressurizing means for controlling an ink pressure. Wherein, the flexible diaphragm 27 about which has been described above is utilized and the ink-jet recording apparatus is so constructed as shown in the block diagram of FIG. 54, and an ink pressure of a recording head 20 is thereby controlled. To be more concrete, the height of the flexible diaphragm 30 is varied according to the ink pressure variations in the recording head. Such variations in the height of this flexible diaphragm 30 are detected by measuring a spatial distance between a displacement detector fixed to the upper part of the flexible diaphragm 30 and this diaphragm 30, and the resulting output signal is inputted to a control circuit. This control circuit processes the signal and outputs a control signal to a circuit for driving a pressurizing means and the like. Upon receipt of the signal given from this driving circuit, the pressurizing means activates to pressurize ink of an ink cartridge so that the ink is poured into the recording head to restore the ink pressure. When an ink amount in the recording head is reduced and a liquid pressure is then lowered during a printing operation by a rapid consumption of ink, a position to which the flexible diaphragm is lowered is detected by the abovementioned system and a suitable amount of ink is thereby poured from an ink tank so as to maintain the ink amount or ink pressure of the recording head constant within the fixed upper limit to the lower limit, therefore stable ink drop jetting characteristics may be secured to display. Also in the case that an ink pressure of the recording head is raised by temperature and humidity variation or the like, the raised liquid pressure can be restored to maintain a specific pressure by detecting the pressure in a similar manner to the above to lower the pressure.

Should the abovementioned liquid pressure adjustment be failed, or in an apparatus not having any liquid pressure adjusting means, a warning is sent through a driving circuit at the time of detecting that the height of flexible diaphragm 27 is lowered in excess of a specific level, and a printing operation is suspended when the liquid pressure is further lowered. These warning and printing suspension may be divided into two steps or may be made simultaneously.

In the abovegiven example, the invention is described with reference to ink-jet recording apparatuses, and it is however to be understood that the invention may be applied to such a recording apparatus forming an image by ink as a pen-recorder or the like.

What is claimed is:

1. An ink jet recording apparatus comprising:

at least one ink-droplet jetting nozzle having an orifice of defined aperture;

a pressure chamber communicating with said at least one nozzle and having a flexible wall;

an ink supply system for supplying ink from an ink reservoir to said pressure chamber of said at least one nozzle;

said ink supply system comprising an ink chamber having a flexible diaphragm forming a wall thereof and which is deformable responsive to at least one of the ink pressure in said ink chamber and the amount of ink remaining in said ink chamber;

said flexible diaphragm being deformable such that a displacement thereof responsive to an ink-pressure variation of $-5$ to $-10$ cm $H_2O$ is from 5 $\mu$m/cm $H_2O$ to 20 mm/cm $H_2O$;

a light shielding means coupled to said flexible diaphragm so as to be movable responsive to deformation of said flexible diaphragm; and light detecting means including a light emitting element and a light receiving element for receiving light emitted by said light emitting element, a light path being provided between said light emitting element and said light receiving element, said light detecting means being arranged adjacent said light shielding means;

said light shielding means being selectively movable into and out of said light path to selectively block light emitted from said light emitting element from being received by said light receiving element as a function of the deformation of said flexible diaphragm.

2. The ink jet recording apparatus of claim 1, wherein said light shielding means blocks said light path when said at least one of said ink pressure and amount of ink in said ink chamber is within a predetermined normal operating range.

3. The ink jet recording apparatus of claim 2. wherein said light shielding means is movable out of said light path responsive to at least one of said ink pressure and remaining amount of ink falling below said predetermined normal range, responsive to deformation of said flexible diaphragm.

4. The ink jet recording apparatus of claim 1, wherein said light shielding means is directly connected to said flexible diaphragm so as to be movable responsive to deformation of said flexible diaphragm.

5. The ink jet recording apparatus of claim 1, including means coupled to said light shielding means for guiding said light shielding means for vertical up and down movement of said light shielding means responsive to said deformation of said flexible diaphragm.

6. The ink jet recording apparatus of claim 1, wherein said light shielding means comprises a lever coupled to said flexible diaphragm and having a light shielding member connected to said lever for selective movement in and out of said light path.

7. The ink jet recording apparatus of claim 6, wherein said lever is pivotally mounted at an intermediate portion thereof, one end of said lever being coupled to said flexible diaphragm, and the other end of said lever carrying said light shielding member.

8. The ink jet recording apparatus of claim 1, wherein said light shielding means comprises a vertical elongated member having one end coupled to said flexible diaphragm, and having a light shielding member extending from the other end of said vertical member, said light shielding member being movable into and out of said light path responsive to deformation of said flexible diaphragm.

9. The ink jet recording apparatus of claim 8, further comprising guide means for maintaining said vertical member substantially vertical and for guiding said vertical member during vertical movement thereof responsive to deformation of said flexible diaphragm.

* * * * *